US011941861B2

(12) United States Patent
Bredno et al.

(10) Patent No.: US 11,941,861 B2
(45) Date of Patent: Mar. 26, 2024

(54) SYSTEMS AND METHODS FOR COMPUTING THE CONTRIBUTIONS OF AUTOFLUORESCENCE IN MULTICHANNEL IMAGE

(71) Applicant: VENTANA MEDICAL SYSTEMS, INC., Tucson, AZ (US)

(72) Inventors: Joerg Bredno, Tucson, AZ (US); Mehrnoush Khojasteh, Tucson, AZ (US); Ilya Ravkin, Tucson, AZ (US); Smadar Shiffman, Tucson, AZ (US); Xingwei Wang, Tucson, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 358 days.

(21) Appl. No.: 17/444,624

(22) Filed: Aug. 6, 2021

(65) Prior Publication Data

US 2021/0397870 A1 Dec. 23, 2021

Related U.S. Application Data

(63) Continuation of application No. PCT/US2020/017436, filed on Feb. 10, 2020.

(Continued)

(51) Int. Cl.
*G01N 21/64* (2006.01)
*G06V 10/34* (2022.01)
*G06V 20/69* (2022.01)

(52) U.S. Cl.
CPC ............ *G06V 10/34* (2022.01); *G06V 20/695* (2022.01)

(58) Field of Classification Search
CPC ......... G06V 10/34; G06V 20/695; G01J 3/28; G01J 2003/2843; G01J 2003/2866;
(Continued)

(56) References Cited

U.S. PATENT DOCUMENTS 9,310,302 B2    4/2016   Garsha et al.
10,126,242 B2   11/2018  Miller et al.
(Continued)

FOREIGN PATENT DOCUMENTS

EP        2191774 A1      6/2010
JP        2016099253 A    5/2016
(Continued)

OTHER PUBLICATIONS

Mansfield, James R., et al., "Autofluorescence removal, multiplexing, and automated analysis methods for in-vivo flourenscens imaging", *Journal of Biomedical Optics*, vol. 10, No. 4, 2005, p. 041207.
(Continued)

*Primary Examiner* — Huy C Ho
(74) *Attorney, Agent, or Firm* — Kilpatrick Townsend & Stockton LLP

(57) ABSTRACT

Disclosed herein are systems and methods of estimating the autofluorescence (AF) signal and other non-target signals in each channel of a multi-channel image of a biological sample that is stained with one or more fluorescent labels. In some embodiments, the estimated autofluorescence signal can then be subtracted or masked from the multi-channel image. In some embodiments, the autofluorescence-removed multichannel image can then be use for further processing (e.g. image analysis, etc.).

20 Claims, 28 Drawing Sheets

Related U.S. Application Data

(60) Provisional application No. 62/805,239, filed on Feb. 13, 2019.

(58) Field of Classification Search
CPC .............. G01J 3/4406; G01N 21/6428; G01N 21/6486; G01N 21/6458; G01N 2021/6417; G01N 2021/6441; G01N 21/6456
USPC ........................................................ 382/133
See application file for complete search history.

(56) References Cited

U.S. PATENT DOCUMENTS

| | | |
|---|---|---|
| 2008/0294032 A1 | 11/2008 | Levenson |
| 2013/0230866 A1* | 9/2013 | Miyashita .............. G01N 33/94 435/7.1 |
| 2015/0347702 A1 | 12/2015 | Chukka et al. |
| 2017/0294017 A1 | 10/2017 | Yuan et al. |
| 2017/0337695 A1 | 11/2017 | Sarkar et al. |
| 2018/0012355 A1 | 1/2018 | Sarkar et al. |

FOREIGN PATENT DOCUMENTS

| | | |
|---|---|---|
| JP | 2017533415 A | 11/2017 |
| WO | 2017191699 A1 | 11/2017 |
| WO | 2018115055 | 6/2018 |
| WO | 2018189370 | 10/2018 |

OTHER PUBLICATIONS

International Search Report received in the corresponding International Application No. PCT/US2020/017436, dated Jun. 10, 2020.
Application No. JP2021-547359 , Office Action, dated Oct. 19, 2022, 9 pages.
Wiederschain, The Handbook—A Guide to Fluorescent Probes and Labeling Technologies, Molecular Probes, ISSN 0006-2979, Biochemistry (Moscow), 2011, vol. 76, No. 11, p. 1276.
EP Application No. 20710378.9 , "Office Action", dated Jul. 27, 2023, 4 pages.
JP Application No. 2023-017717, "Notice of Allowance", dated Dec. 15, 2023, 5 pages.

* cited by examiner

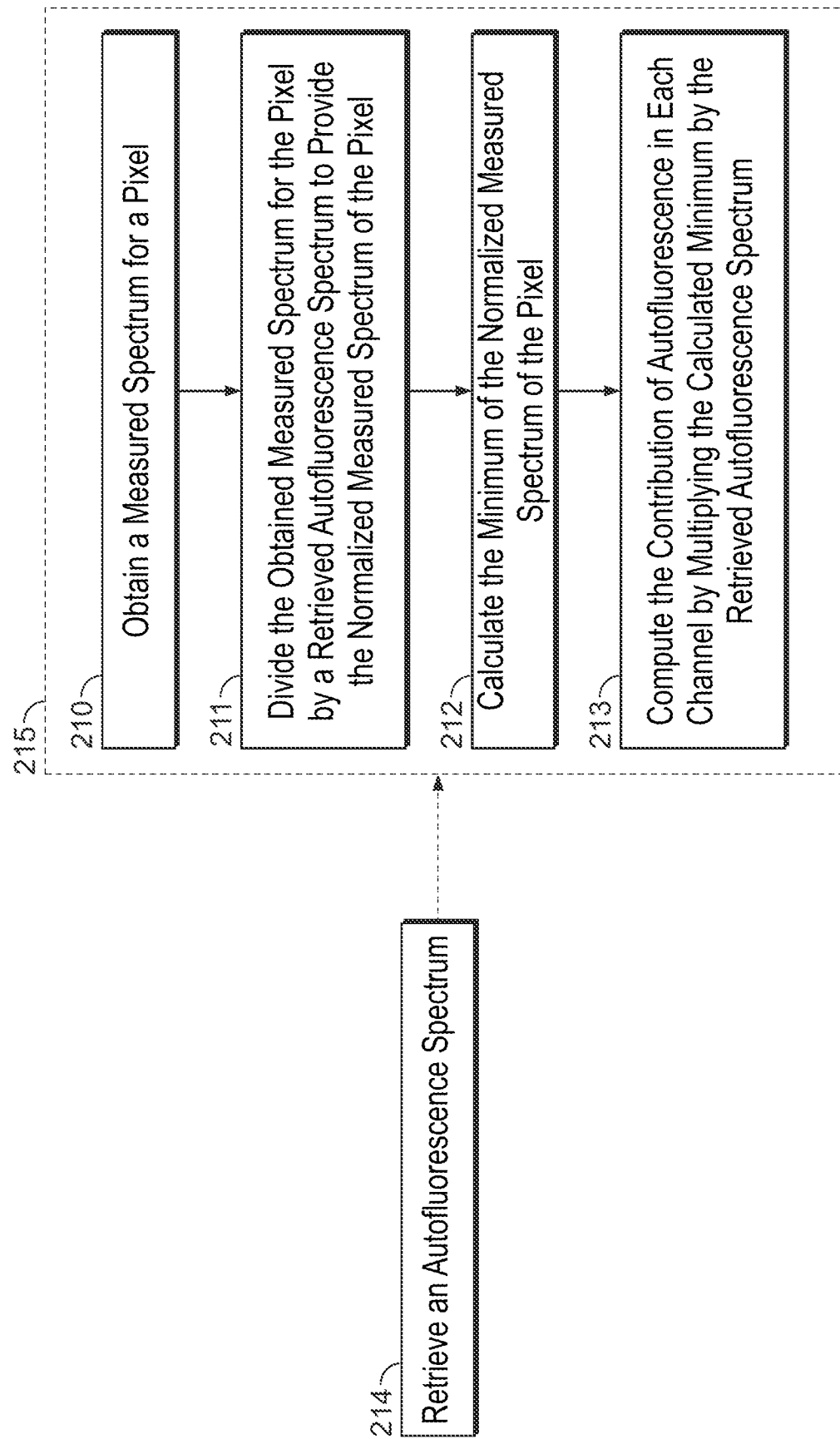

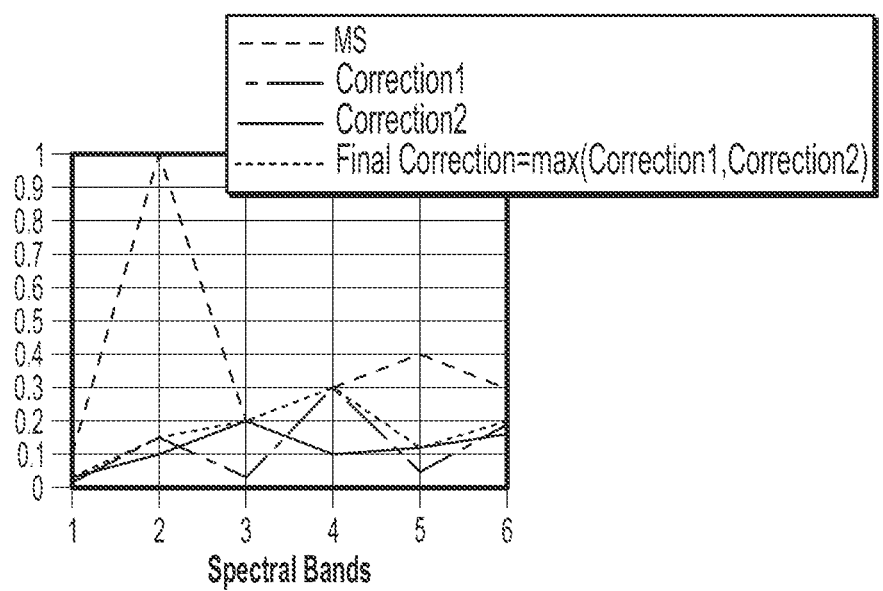
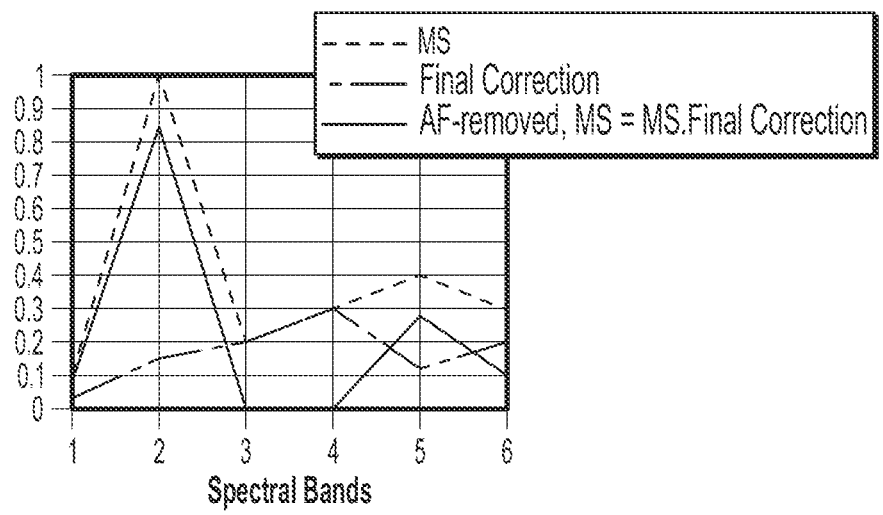
FIG. 2D1

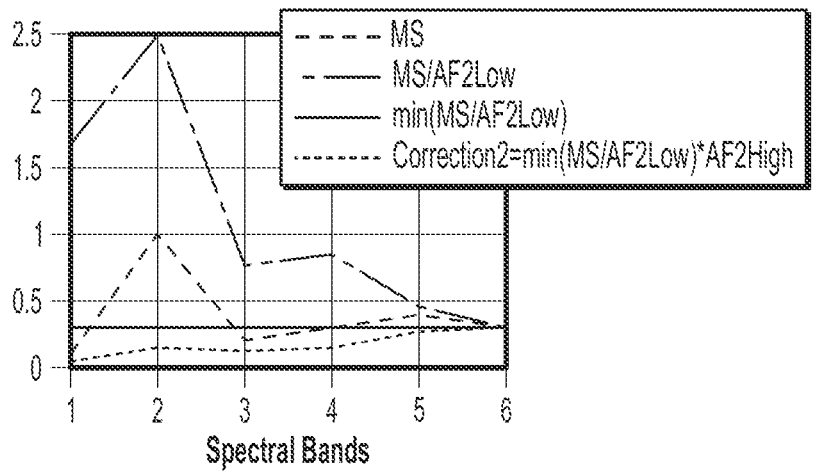
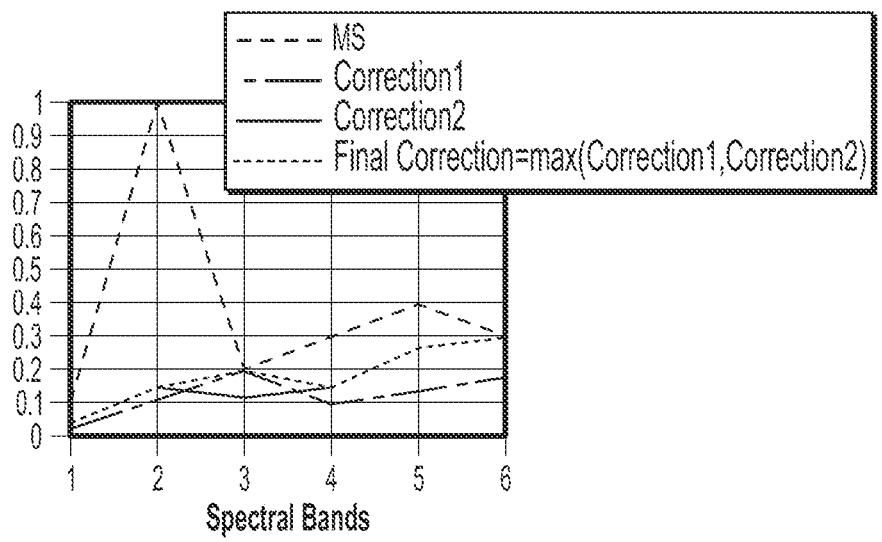
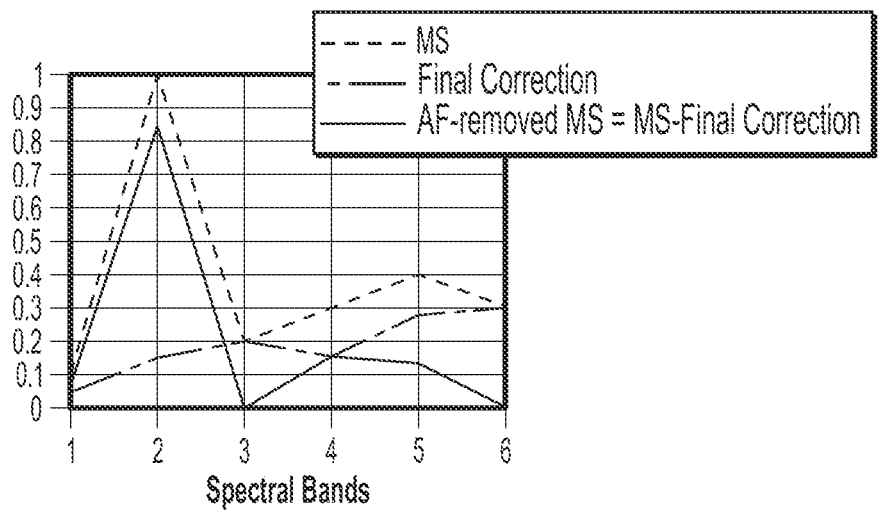
FIG. 2F1

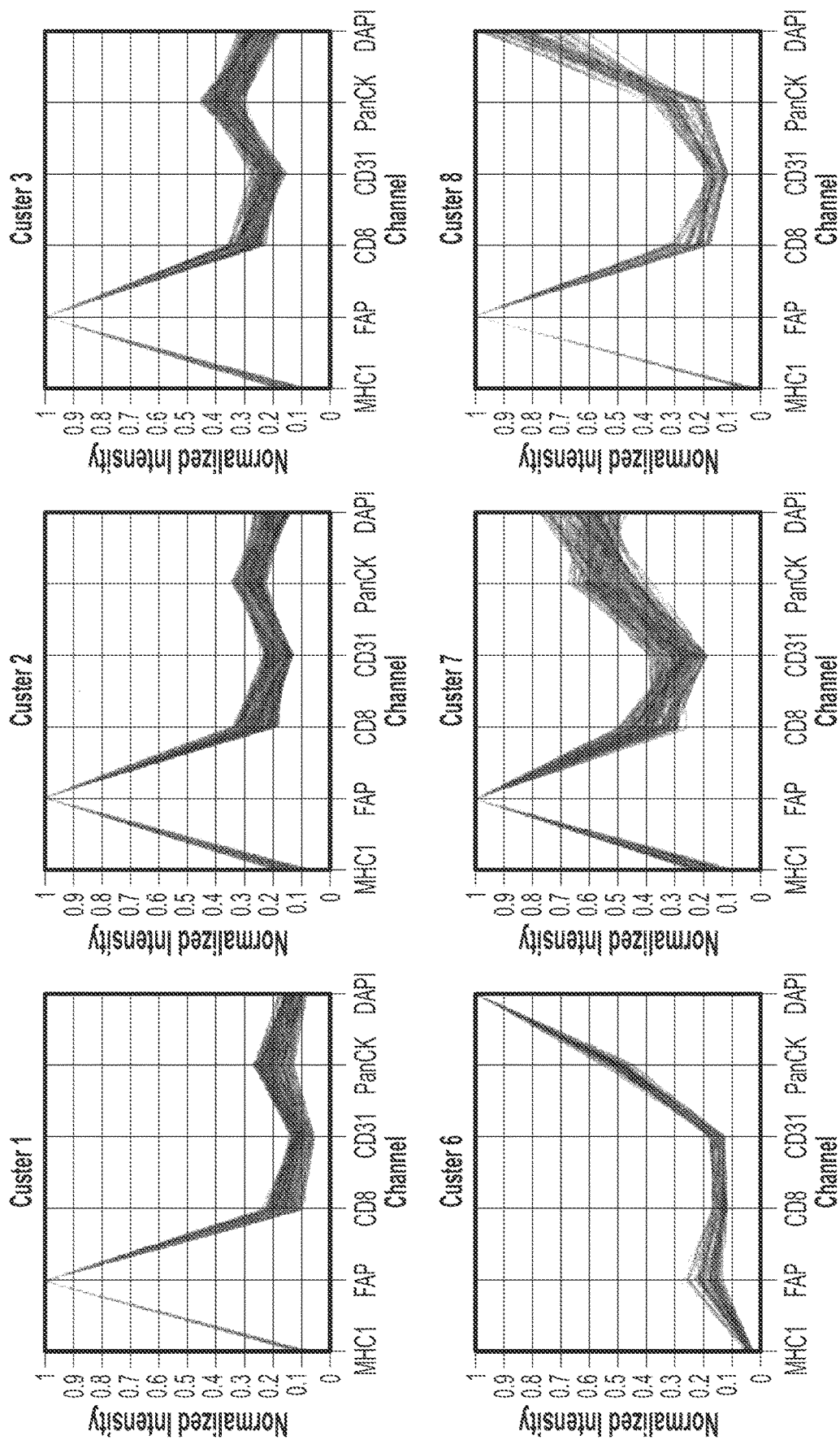

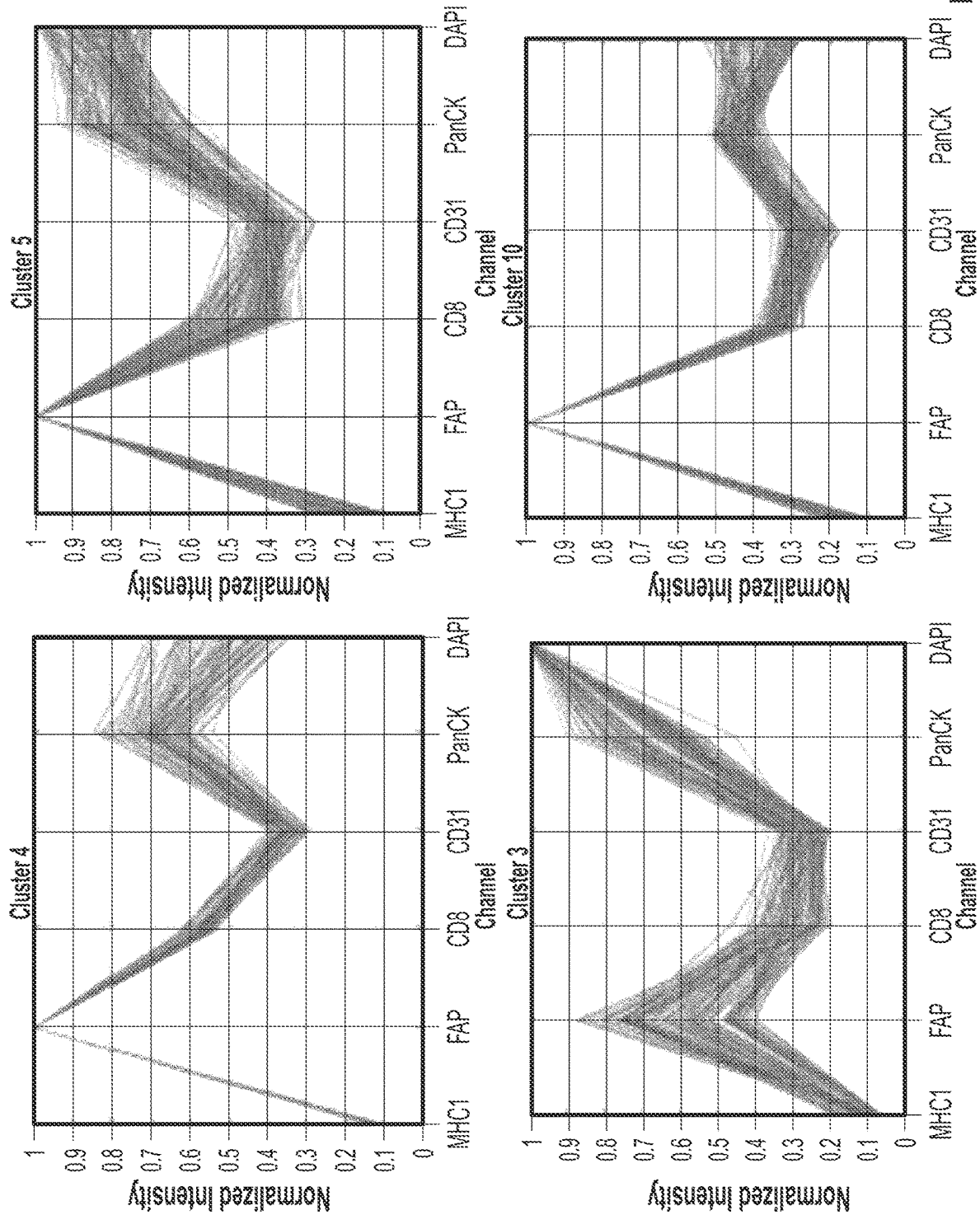
FIG. 6D1

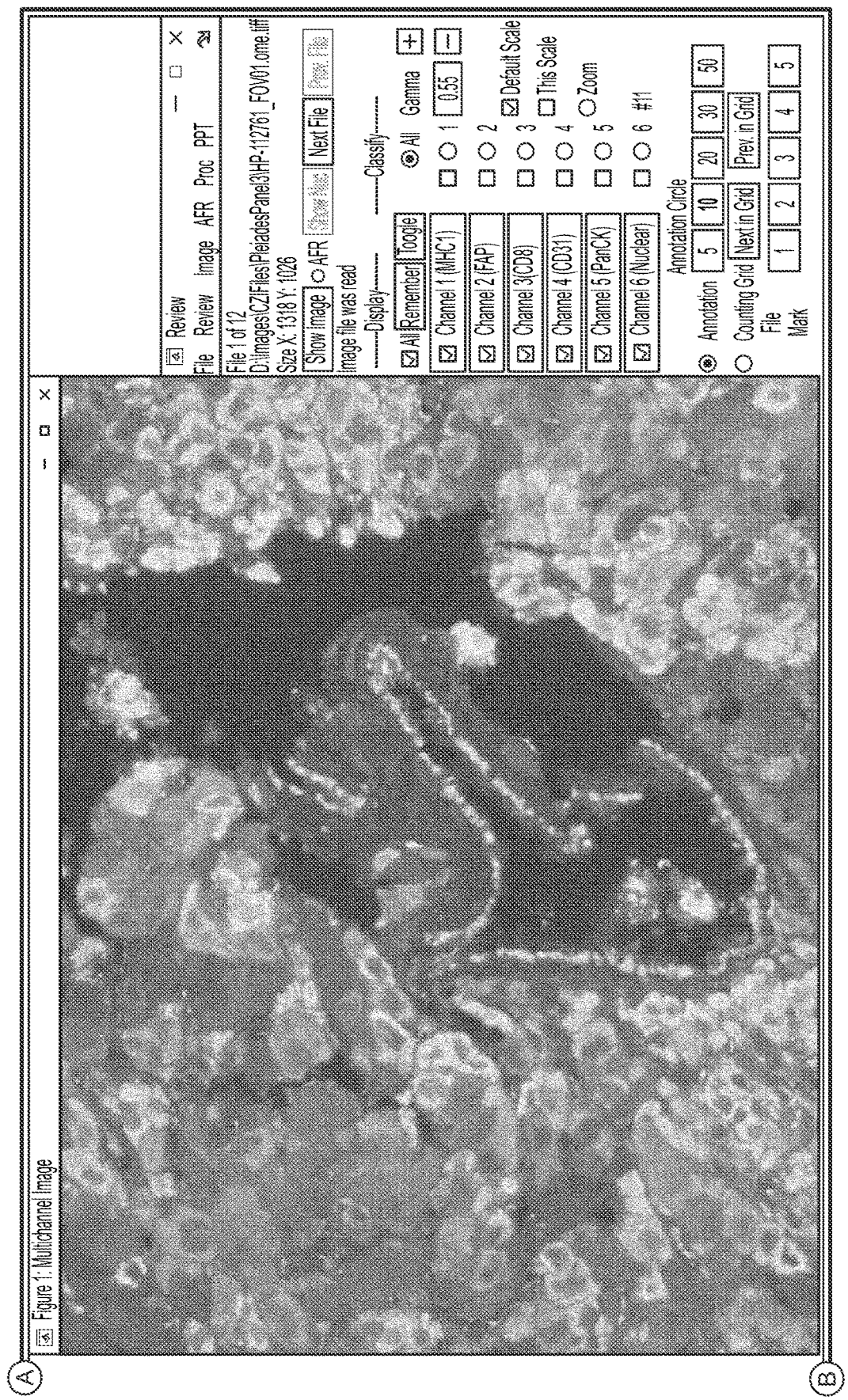
FIG. 6E1

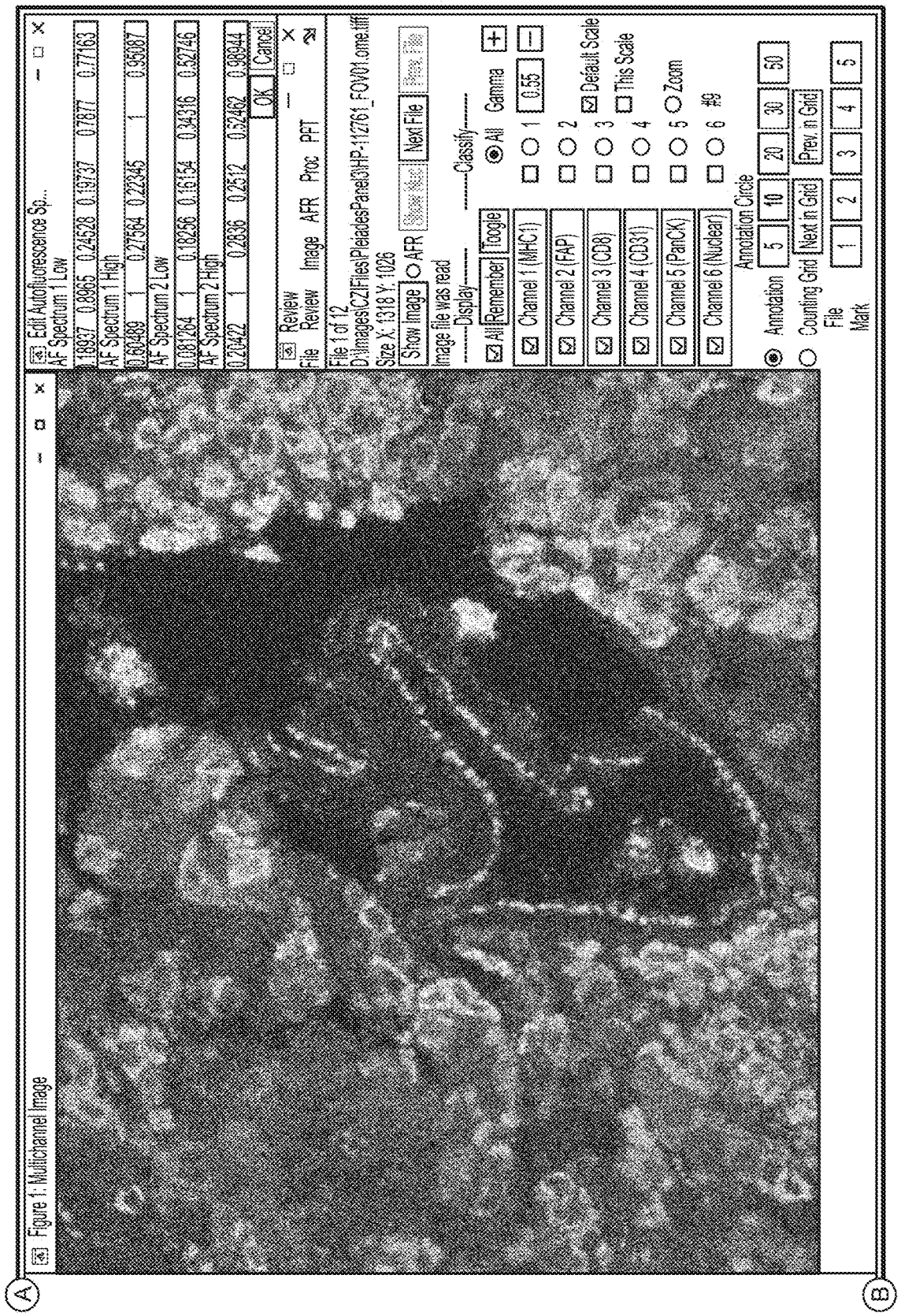
FIG. 6F1

SYSTEMS AND METHODS FOR COMPUTING THE CONTRIBUTIONS OF AUTOFLUORESCENCE IN MULTICHANNEL IMAGE

CROSS REFERENCE TO RELATED APPLICATIONS

The present application is a continuation filed under 35 U.S.C. § 111(a), which claims priority to International Application PCT/US2020/017436, filed Feb. 10, 2020, which claims priority to U.S. Provisional Application No. 62/805,239, filed on Feb. 13, 2019, the disclosures of which are incorporated herein by reference in their entirety for all purposes.

BACKGROUND

Fluorescence imaging of biological cell and tissue samples is used to visualize the presence and expression levels of specific antigens, such as using probes that conjugate antibodies to fluorescent dyes. It is possible to visualize multiple proteins in a given tissue section using probes that target specific antigens of interest, together with one or more histological dyes such as DAPI, a nuclear counterstain. Other targets such as RNA or DNA can be visualized using fluorescent in situ hybridization and oligo-labeled fluorescent probes, respectively.

Fluorescence imaging of a dye involves exciting it with light of a first wavelength band or range of wavelengths, and observing light that it emits in response to this, such as light emitted in a second wavelength band or range of wavelengths. The propensity of a fluorescent dye to emit light in response to excitation at a given wavelength is termed its excitation spectrum. The wavelength distribution of the fluorescent light a dye emits is termed its emission spectrum.

When multiple dyes are used, they are typically chosen to have different excitation spectra, emission spectra, or both, so that by careful choice of the excitation wavelengths and emission wavelengths used, the dye that is being observed can be distinguished. When the spectra of the various fluorescent dyes are not distinct, but overlap substantially in terms of their excitation spectra and emission spectra, it becomes more difficult to determine what dye is associated with the observed emitted light that one observes.

Many samples exhibit endogenous fluorescence emission. That means that when optically excited, the sample itself emits fluorescent light, in addition to the fluorescent light emitted by fluorescent dyes used in connection with antibody-conjugated probes or as a counterstain. This can add further complexity to the above-mentioned determination.

Multispectral imaging of fluorescent samples involves acquiring a series of images of the sample at different excitation wavelengths, emission wavelengths, or combinations of the two. The various images are assembled into an image cube, where two dimensions of the cube correspond to spatial position in the sample, and the third dimension corresponds to the spectrum associated with the various excitation and/or emission wavelengths.

BRIEF SUMMARY

The present disclosure provides systems and methods for estimating autofluorescence (AF) signals and other non-target signals within each channel of a multi-channel image of a biological sample (e.g. tissue section) stained with multiple fluorescent labels. In some embodiments, the estimated autofluorescence signal may be subtracted and/or masked from the multi-channel image. In some embodiments, the autofluorescence-removed multichannel image may be used for further processing (e.g. image analysis, etc.).

In general, for the acquisition of image data, sections of tissue are processed such that biomarkers of interest (e.g., proteins, RNA segments, or DNA segments) are labeled with different fluorophores. Each type of fluorophore emits light of a specific emission light spectrum (or color) when excited with light at a suitably selected excitation spectrum. In some embodiments, in addition to the target signal created by the different fluorophores, an acquired image can further include non-target signals. It is believed that a major source for such non-target signal is autofluorescence, i.e. the light emitted by fluorescence that is inherent to the molecules contained in tissue. In some embodiments, other sources of non-target signal include red blood cells, dead cells, and reagents that are auxiliary to the slide creation process, for example the mounting medium used to affix a coverslip to a glass slide with a tissue section.

Fluorescent multiplexed staining approaches offer great potential in extracting information about expression, co-expression, and co-localization of multiple biomarkers within the context of tissue architecture, thus preserving the spatial information and inter-relationship of the biomarkers. Fluorescent multiplexed assays require imaging of multiple fluorescent markers, making imaging an essential component in the workflow. Different imaging modalities have been employed for imaging and subsequent analysis of fluorescent multiplexed assays. The two major approaches include the following:

(i) Use of a multispectral camera for detection. In this configuration, the spectral information from a multiplexed panel of targets is captured through a multispectral camera or detector resulting in a multi-spectral image cube. The detected signal in every spectral channel is then a linear combination of signals from all fluorophores and AF.

(ii) Use of a filter cube (set of excitation and emission filters) corresponding to each fluorophore and detection of FL emissions using a monochrome camera. This results in a multichannel image of the specimen, where each channel corresponds to one fluorophore. The excitation and emission filters are selected in a way that minimizes FL cross-talk caused by simultaneous detection of FL signal from more than one fluorophore within a single imaging channel. Despite this, it is believed that there will be some cross-talk between fluorophores in the detected multichannel image that will need to be removed by subsequent analysis to allow for accurate assessment of individual fluorophore intensities.

In both approaches, the detected fluorescent signal in each spectral channel is derived from multiple fluorophores plus the autofluorescence signal from tissue, mounting media and the glass slide. In some embodiments, linear spectral unmixing is used to separate the contributions of different fluorophores to the detected signal in each spectral channel. In order for the spectral information to be reliably unmixed and quantitated, correct examples of each fluorophore emission spectrum, as well as a representative autofluorescence spectrum from an unstained sample, in the context to be used, must be obtained. Linear spectral unmixing requires a minimum number of spectral channels that is equal to the number of all fluorescent sources, i.e. fluorophores plus autofluorescence.

The first imaging modality described above typically captures the spectral information in a large number of spectral channels, and thus satisfies the requirement for a minimum number of spectral channels for the linear spectral unmixing. However, the cost of such multispectral detection imaging systems, the longer image acquisition times, and the higher memory requirements for storing the multispectral images may be factors that prevent the use of such a modality. If such an imaging modality is used, it is still desirable to capture images in a smaller number of detection channels to reduce acquisition time and storage space requirements.

In the case of the second imaging modality that uses one filter cube corresponding to each fluorophore, it may not be always feasible or efficient to add an additional filter cube to capture the autofluorescence signal. In such cases, an analysis method is needed to estimate the autofluorescence signal based on the multichannel image of the specimen, where each channel corresponds to one fluorophore.

In both modalities, if the number of image channels equals or is greater than the number of fluorescent markers in the specimen, then linear spectral unmixing methods can be used to unmix the contributions of the fluorescents markers and autofluorescence to the fluorescence signal at every pixel of the multichannel image. An analysis method that can estimate the autofluorescence signal from a multichannel or multispectral image using a smaller number of image channels is believed to be advantageous due to acquisition time and image storage space considerations. In some embodiments, the systems and methods described herein advantageously allow for faster image acquisition time, reduced image storage requirements, and less fluorescent excitation of the stained tissue during image acquisition. Since fluorophores are subject to photo-bleaching, meaning that the yield of emitted fluorescent light reduces over time and with every excitation, acquisitions with less excitation allow for a more reproducible image acquisition if a re-scan of a stained slide becomes necessary. In some embodiments, the systems and methods presented herein may be applied for image acquisitions with a minimum number of acquisition channels, particularly for an acquisition using matched filters where only one filter set per target fluorophore signal is used. In view of the foregoing, the present disclosure is directed, in some embodiment, to systems and methods for determining the contributions of autofluorescence within each channel of a multichannel image of a biological sample stained with a plurality of fluorescent labels. In some embodiments, autofluorescence is removed while retaining as many specific fluorescent labels as possible.

In one aspect of the present disclosure is a method of removing contributions of autofluorescence in one or more channels of a multichannel image of a biological sample stained with one or more fluorescent labels, comprising independently calculating the contribution of autofluorescence in each channel of each pixel of the multichannel image based on one or more retrieved autofluorescence spectra, and subtracting from each measured pixel spectrum of the multichannel image the calculated contribution of autofluorescence in each channel for that respective pixel. In some embodiments, the contribution of autofluorescence in each channel of each pixel of the multichannel image is calculated from a single retrieved autofluorescence spectrum. In some embodiments, the single retrieved autofluorescence spectrum is derived from measured signals corresponding to unlabeled portions of a training multichannel image of a biological sample comprising one or more fluorescent labels. In some embodiments, the contribution of autofluorescence in each channel of each pixel is calculated by independently fitting the single retrieved autofluorescence spectrum to each measured spectrum of a pixel of the multichannel image. In some embodiments, the fitting comprises (i) dividing the measured spectrum of the pixel of the multichannel image by the single retrieved autofluorescence spectrum to provide a normalized measured spectrum of the pixel; (ii) calculating the minimum of the normalized measured spectrum of the pixel; and (iii) scaling the calculated minimum by the single retrieved autofluorescence spectrum.

In some embodiments, the contribution of autofluorescence in each channel of each pixel of the multichannel image is calculated from at least two retrieved autofluorescence spectra. In some embodiments, the at least two retrieved autofluorescence spectra are derived from measured signals corresponding to unlabeled portions of training multichannel images of a biological sample comprising one or more fluorescent labels. In some embodiments, the calculated contribution of autofluorescence in each channel of each pixel of the multichannel image is a maximum autofluorescence correction value independently identified for each channel of each pixel of the multichannel image. In some embodiments, the maximum autofluorescence correction for each channel of each pixel of the multichannel image is identified by: (i) computing at least two estimated autofluorescence corrections for each channel by independently fitting each of the at least two retrieved autofluorescence spectra to a measured spectrum of a pixel; (ii) determining in each channel a maximum autofluorescence intensity value of the computed at least two estimated autofluorescence corrections. In some embodiments, the at least two retrieved autofluorescence spectra comprise at least two autofluorescence low-high spectral pairs.

In another aspect of the present disclosure is a system for removing contributions of autofluorescence in one or more channels of a multichannel image of a biological sample stained with one or more fluorescent labels, the system comprising: (i) one or more processors, and (ii) one or more memories coupled to the one or more processors, the one or more memories to store computer-executable instructions that, when executed by the one or more processors, cause the system to perform operations comprising: (a) independently calculating a maximum autofluorescence correction in each channel of each pixel of the multichannel image, wherein the calculated maximum autofluorescence correction in each channel of each pixel is derived from at least two different retrieved autofluorescence spectra; and (b) subtracting from each measured pixel spectrum of the multichannel image the calculated maximum autofluorescence correction in each channel for that pixel.

In some embodiments, the maximum autofluorescence correction for each channel of each pixel is calculated by: (i) computing at least two estimated autofluorescence corrections for each channel by independently fitting each of the retrieved at least two autofluorescence spectra to a measured spectrum of a pixel; (ii) identify in each channel a maximum autofluorescence intensity value of the computed at least two estimated autofluorescence corrections. In some embodiments, each independent fitting comprises (i) dividing the measured spectrum of the pixel of the multichannel image by one of the at least two retrieved autofluorescence spectra to provide a normalized measured spectrum of the pixel; (ii) calculating the minimum of the normalized measured spectrum of the pixel; and (iii) scaling the calculated minimum by the one of the at least two retrieved autofluorescence spectra.

In some embodiments, the at least two retrieved autofluorescence spectra comprise at least two autofluorescence low-high spectral pairs. In some embodiments, each independent fitting comprises (i) dividing the measured spectrum of the pixel of the multichannel image by a first autofluorescence low spectrum of one of the at least two autofluorescence low-high spectral pairs, (ii) calculating the minimum of the normalized measured spectrum of the pixel; and (iii) scaling the calculated minimum by a first autofluorescence high spectrum of the corresponding one of the at least two autofluorescence low-high spectral pairs.

BRIEF DESCRIPTION OF THE FIGURES

For a general understanding of the features of the disclosure, reference is made to the drawings. In the drawings, like reference numerals have been used throughout to identify identical elements.

FIG. 2B sets forth a flowchart illustrating the various steps of computing the contributions of autofluorescence in each channel of a measured pixel spectrum using a single autofluorescence spectrum, in accordance with some embodiments.

FIGS. 2D and 2D1 depicts a workflow showing the output of each step of the method depicted in FIG. 2C.

FIGS. 2F and 2F1 depicts a workflow showing the output of each step of the method depicted in FIG. 2E.

FIGS. 6D and 6D1 illustrates several different groupings of autofluorescence spectra derived from the spectra of FIG. 6C.

FIGS. 6E and 6E1 illustrates a grouping of autofluorescence spectra (upper left panel) and spectral pairs derived therefrom (lower left panel).

FIGS. 6F and 6F1 illustrates a grouping of autofluorescence spectra (upper left panel) and spectral pairs derived therefrom (lower left panel).

DETAILED DESCRIPTION

Figure 1A:
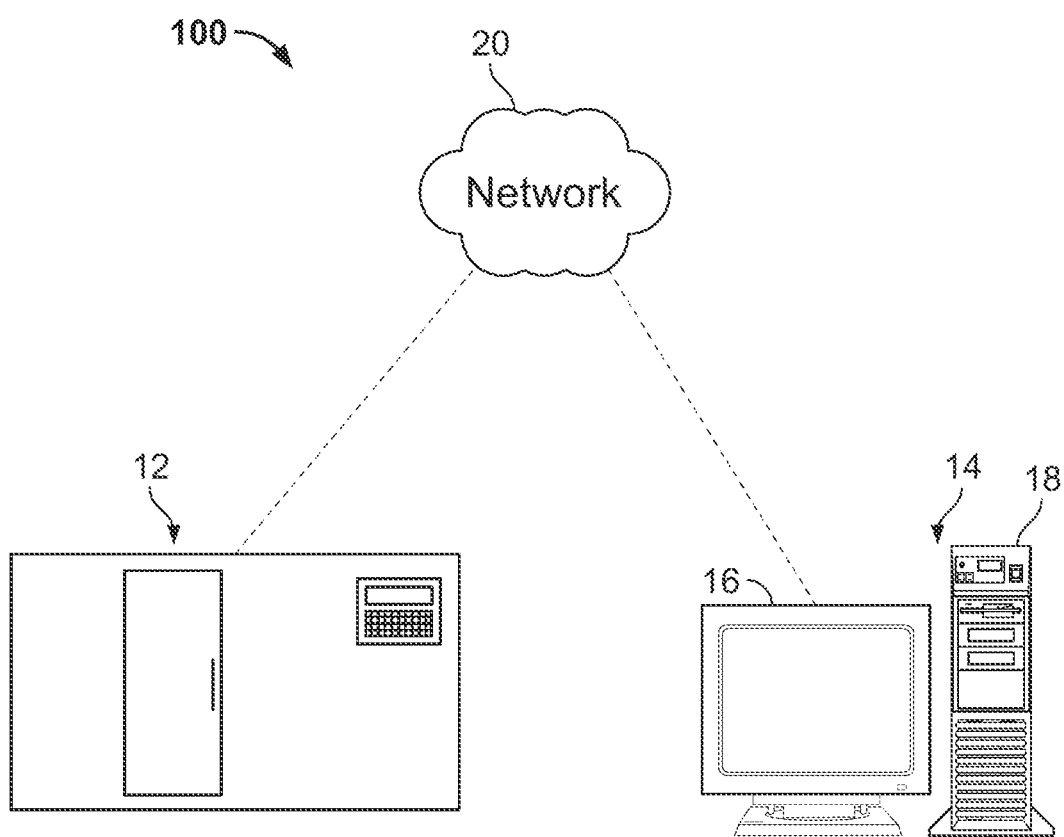
FIG. 1A illustrates a representative digital pathology system including an image acquisition device and a computer system, in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample," "tissue sample," "specimen" or the like refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the terms "label" refer a reagent that is capable of binding to an analyte, being internalized or otherwise absorbed, and being detected, e.g., through shape, morphology, color, fluorescence, luminescence, phosphorescence, absorbance, magnetic properties, or radioactive emission. Suitable examples of fluorescent labels include molecules such as fluoresceins, coumarins, BODIPY dyes, resorufins, and rhodamines (many additional examples of fluorescent molecules can be found in *The Handbook—A Guide to Fluorescent Probes and Labeling Technologies*, Molecular Probes, Eugene, OR).

A "mask" as used herein is a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed, or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

As used herein, the term "multichannel image" refers to a digital image obtained from a biological tissue sample in which different biological structures are simultaneously stained with specific stains, fluorescent dyes, quantum dots, chromogens, etc. (or any combination thereof), each of which fluoresces or are otherwise detectable in a different spectral band thus constituting one of the channels of the multichannel image. A multichannel image may comprise any number of channels, e.g. 2 channels, 3 channels, 4 channels, 5 channels, 6 channels, 9 channels, etc.

As used herein, the terms "multiplex," "multiplexed," or "multiplexing" refer to detecting multiple targets in a sample concurrently, substantially simultaneously, or sequentially. Multiplexing can include identifying and/or quantifying multiple distinct nucleic acids (e.g., DNA, RNA, mRNA, miRNA) and polypeptides (e.g., proteins) both individually and in any and all combinations.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Some staining performed by the system can be used to visualize an outline of a cell. Other staining performed by the system may rely on certain cell components (such as molecules or structures) being stained without or with relatively little staining other cell components. Examples of types of staining methods performed by the system include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

The present disclosure is directed, in some embodiments, to systems and methods for determining the contributions of autofluorescence within each channel of a multichannel image of a biological sample stained with two or more fluorescent labels, three or more fluorescent labels, four or more fluorescent labels, etc. In other embodiments, the present disclosure is directed to systems and methods for determining the contributions of autofluorescence within each channel of a multichannel image of a biological sample stained with a plurality of fluorescent labels. In some embodiments, autofluorescence is removed while retaining as many specific fluorescent labels as possible.

In some embodiments, the present disclosure also provides for systems and methods for generating a multichannel image of a biological sample stained with a plurality of fluorescent labels, wherein the generated multichannel image of the biological sample is corrected for autofluorescence, i.e. where calculated contributions of autofluorescence are removed (e.g. subtract and/or masked) from the multichannel image.

A multichannel image is comprised of multiple images of a specimen where each image is captured under a certain set of excitation and/or emission wavelengths. Each set of excitation and/or emission wavelengths is referred to as a "channel." The intensities of every image pixel across the multiple channels of the multichannel image thus form the spectrum of that pixel. It is believed that the image intensity values in each channel of the multichannel image result from contribution of all fluorophores plus autofluorescence and other non-target signals of different sources such as tissue, fixation material, mounting media, glass slide and cover slip.

At least some embodiments of the present disclosure relate to systems and methods for analyzing digital images captured from biological samples, including tissue samples, stained with one or more fluorescent labels. A digital pathology system 100 for imaging and analyzing specimens, in accordance with some embodiments, is illustrated in FIG. 1A. The digital pathology system 100 may comprise an imaging device 12 (e.g. a microscope or scanner) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory, a computer storage medium, a computer program or set of instructions (e.g. where the program is stored within the memory or storage medium), one or more processors (including a programmed processor), and any other hardware, software, or firmware modules or combinations thereof. For example, the computing system 14 illustrated in FIG. 1A may comprise a computer with a display device 16 and an enclosure 18. The computer can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, other imaging systems, automated slide preparation equipment, etc. Some of these additional components and the various computers, networks, etc. that may be utilized are described further herein. Devices for imaging biological samples stained one with or more fluorescent molecules are described within PCT Publication No. WO/2018/189370 and U.S. Pat. No. 9,310,302, the disclosures of which are hereby incorporated by reference herein in their entireties.

In some embodiments, the imaging device may be a multispectral imaging (MSI) system or a fluorescent microscopy system. In general, MSI equips the analysis of pathology specimens with computerized microscope-based imaging systems by providing access to a spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Figure 1B:
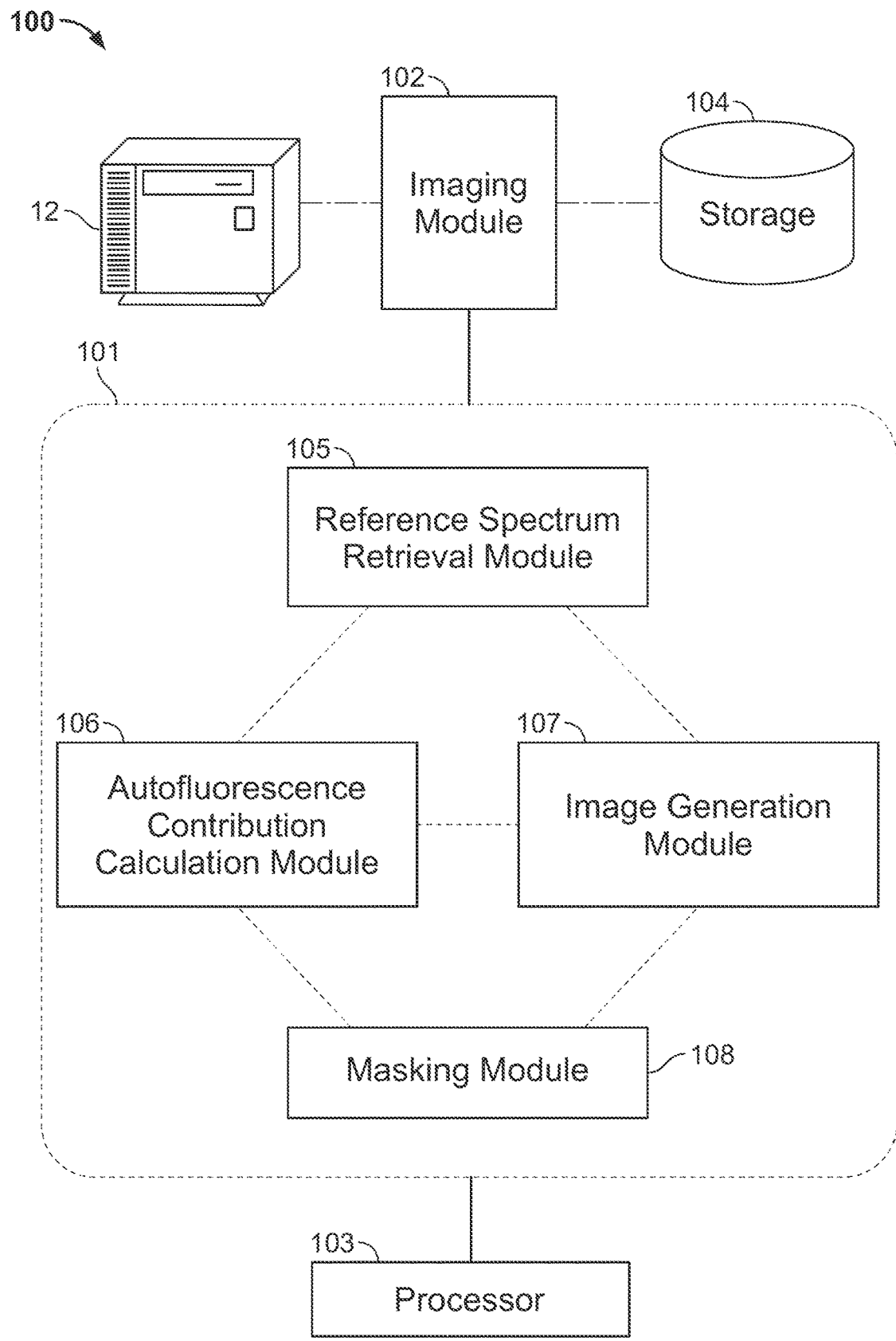
FIG. 1B sets forth various modules that can be utilized in a digital pathology system or within a digital pathology workflow, in accordance with some embodiments.

FIG. 1B provides an overview of the various modules utilized within the presently disclosed digital pathology system. In some embodiments, the digital pathology system employs a computer device 100 or computer-implemented method having one or more processors 103 and one or more memories 101, the at one or more memories storing non-transitory computer-readable instructions for execution by the one or more processors to cause the one or more processors (103) to execute instructions (or stored data) in one or more modules (e.g. modules 105 through 108).

Figure 2A:
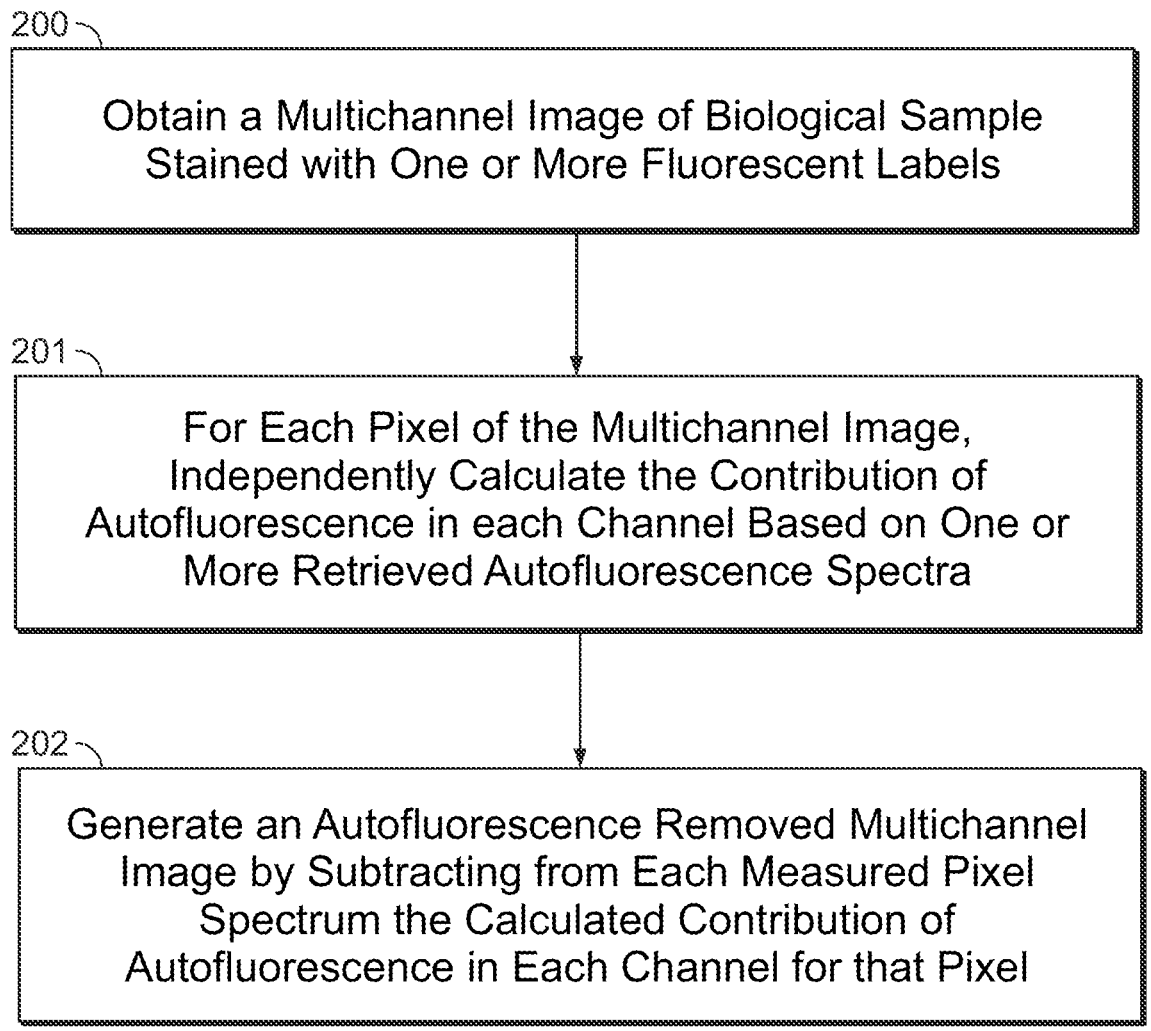
FIG. 2A sets forth a flowchart illustrating the various steps of generating an autofluorescence removed multichannel image in accordance with some embodiments.

With reference to FIGS. 1B and 2A, in some embodiments, systems of the present disclosure include: (a) an imaging module 102 adapted to generate a multichannel image of a biological sample labeled with one or more fluorescent molecules (see, e.g., step 200); (b) a reference spectrum retrieval module 105 configured to retrieve one or more reference spectra (e.g. reference spectra from training images) from a database, such as a database within storage sub-system 104; (c) an autofluorescence contribution calculation module 106 adapted to derive an amount of autofluorescence in a multichannel image based at least on one or more retrieved reference spectra (see, e.g., step 201); and (d) an image generation module 107 to at least generate a autofluorescence removed image, i.e. a multichannel image where autofluorescence has been at least partially removed (see, e.g., step 202). In some embodiments, the system may further comprise a masking module 108 for generating certain exclusion and/or inclusion masks. In some embodiments, additional modules may be incorporated into the workflow as needed. For example, an image analysis module may be run to derive features or metrics from stained objects within the multichannel image (see, for example, PCT Publication No. PCT/US19/41257, the disclosure of which is hereby incorporated by reference herein in its entirety). Likewise, a scoring module may be run to score derived image features, e.g. to score a percent positivity, a membrane or nuclear staining intensity, or to provide an H-score (see, for example, U.S. Publication No. 2015/0347702, the disclosure of which is hereby incorporated by reference herein in its entirety).

In some embodiments, the systems and methods of the present disclosure utilize one or more stored autofluorescence spectra, such as autofluorescence spectra stored in a database within storage sub-system 104, and which may be retrieved using the reference spectrum retrieval module 105. These autofluorescence spectra may be derived from stained samples (e.g. samples labeled with or more fluorescent molecules) or unstained samples. In some embodiments, the autofluorescence spectra are derived from training images, e.g. stained images of biological samples, each including one or more fluorescent labels. In some embodiments, the stained images comprise difference sets of fluorescent molecules or different types of tissue or cellular structures. For example, a multichannel image of a biological sample stained with a plurality of fluorescent labels may be imaged and unwanted emissions and/or excitations within the multichannel image may be identified (see FIG. 3A, where four "different types of autofluorescence to be removed" are illustrated, and where the autofluorescence spectrum of each different type may be stored in a database for later retrieval). The identification of the unwanted emissions and/or excitations may be performed manually or in an automated manner (e.g. running an automated algorithm that identifies certain spectral wavelengths having certain intensities).

In some embodiments, contributions of autofluorescence within each channel of an obtained multichannel image (e.g. a multichannel image of a biological sample stained with one or more fluorescent labels) may be removed by an intensity subtraction method (using modules 105, 106, and 107). In other embodiments, contributions of autofluorescence within each channel of a multichannel image may be removed by applying one or more exclusion and/or inclusion masks (using at least module 108). In yet other embodiments, the contributions of autofluorescence within each channel of a multichannel image may be removed by applying a combination of one or more intensity subtraction and masking methods. For example, a masking approach may be applied to a first portion of a multichannel image to remove some undesired autofluorescence, while an intensity subtraction method may be applied after the application of the mask (such as to the entire multichannel image or just to the first portion) to remove additional contributions of autofluorescence within one or more channels. Likewise, a masking approach may be applied to a first portion of a multichannel image to remove some undesired autofluorescence, while an intensity subtraction method may be applied to a second portion of the multichannel image.

In some embodiments, an intensity subtraction method comprises removing estimated contributions of autofluorescence within each channel of every pixel within a multichannel image. Said another way, the intensity subtraction methods described herein are applied to each pixel of a multichannel image independently, with the end result being the contributions of autofluorescence removed from each channel of the multichannel image (which may be the entire multichannel image, e.g. a whole slide scan, or one or more portions therefore).

In some embodiment, the contributions of autofluorescence within each channel of a multichannel image are derived from a single autofluorescence spectrum, such as one stored in sub-system 104. In some embodiments, a single autofluorescence spectrum may be retrieved from the database using the reference spectrum retrieval module 105 and this single autofluorescence spectrum may be independently fit to the measured spectrum of each pixel of the multichannel image (method 1). Said another way, a fitted autofluorescence spectrum may be generated for each pixel of the multichannel image, where each fitted autofluorescence spectrum is independently generated by matching the single retrieved autofluorescence spectrum to the measured spectrum of one of the pixels of the multichannel image. In some embodiments, the independently generated fitted autofluorescence spectrum for each pixel is subtracted from the measured spectrum of the particular pixel. This process is repeated for each pixel of the multichannel image.

Figure 4:
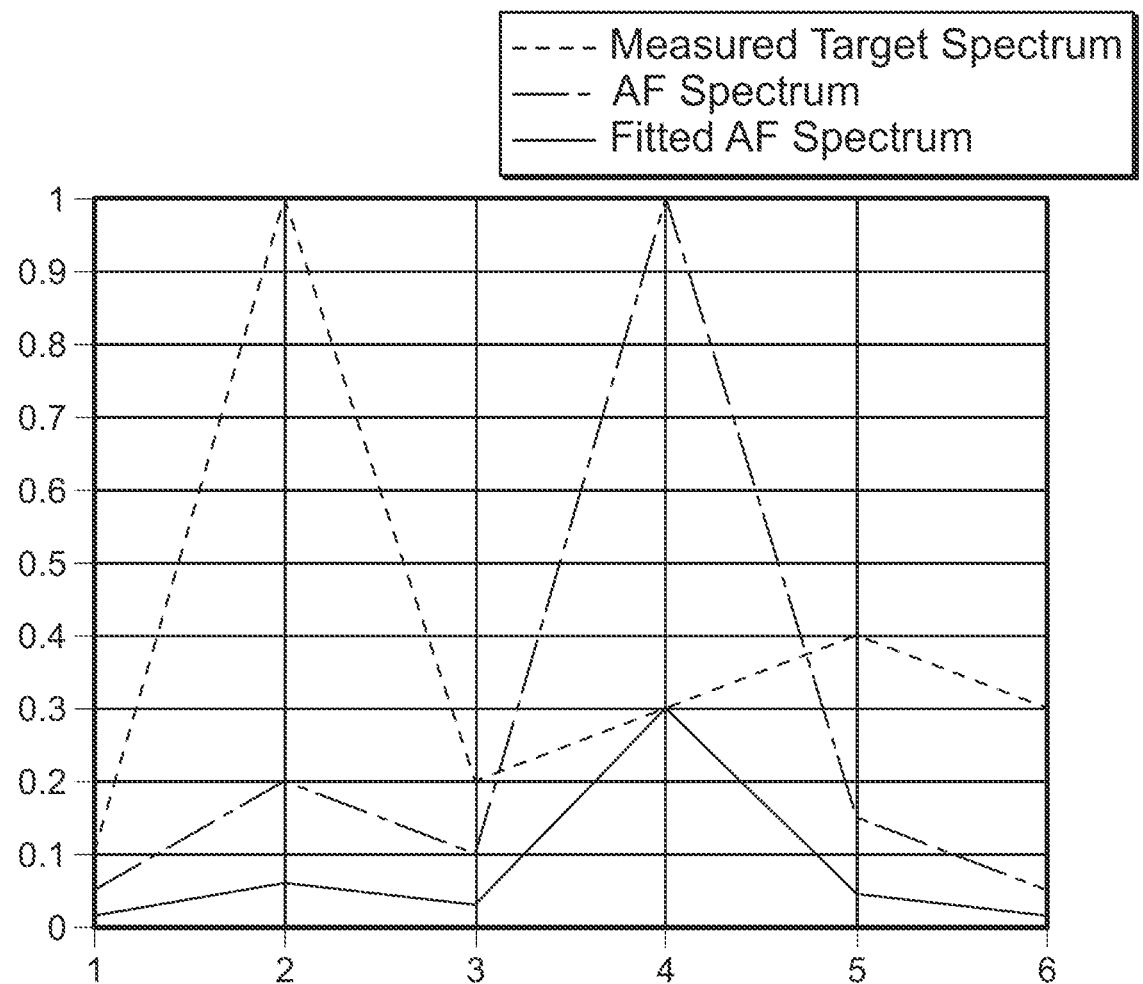
FIG. 4 illustrates a measured pixel spectrum, a retrieved autofluorescence spectrum, and a fitted autofluorescence spectrum.

For example, as illustrated in FIG. 4, the autofluorescence spectrum retrieved from a database may be fit within the measured spectrum of a pixel of the multichannel image to provide the respective fitted autofluorescence spectrum. For instance, for channel 2, where the normalized measured pixel intensity value is 1, and an value of the retrieved autofluorescence spectrum is about 0.2, the fitted spectrum of this particular pixel at channel 2 would have an value of about 0.05. In this example, the "fitting" process is repeated for each of channels 1 through 6. This fitted autofluorescence spectrum for channels 1 through 6 is then subtracted from the measured spectrum of the pixel.

With reference to FIG. 2B, in some embodiments, the process of "fitting" the autofluorescence spectrum to the measured spectrum comprises normalizing the measured pixel spectrum and scaling the retrieved single autofluorescence spectrum to fit within the normalized measured pixel spectrum. In some embodiments, a measured pixel spectrum for a pixel of the input multichannel image is obtained (210). This measured pixel spectrum is divided by a retrieved autofluorescence spectrum to provide a normalized measured spectrum for the particular pixel (211), e.g. an intensity value in each channel of the measured spectrum is divided by the value in each respective channel of the autofluorescence spectrum. As noted above, the autofluorescence spectrum may be retrieved from storage sub-system 104 (step 214). In some embodiments, the retrieved autofluorescence spectrum is derived from a training multichannel image of a biological sample stained with one or more fluorescent molecules. Next, the minimum of the normalized measured spectrum is calculated (212). From this calculated minimum value, the contribution of autofluorescence in each channel may be computed, such as by multiplying the calculated minimum value by the retrieved autofluorescence spectrum (step 213). In some embodiments, it is this computed contribution of autofluorescence in each channel that may be subtracted from the respective channel in the input measured pixel spectrum (202).

In other embodiments, the contributions of autofluorescence within each channel of an obtained multichannel image are derived from two or more different autofluorescence spectra, where such autofluorescence spectra may be retrieved from storage sub-system 104 (method 2). This process is similar to that described above for fitting a single autofluorescence spectrum to a measured pixel spectrum, but differs in that (i) two or more different autofluorescence spectra are each individually fit to each measured pixel spectrum; and (ii) a maximum value of the fitted autofluorescence spectra is utilized in generating a maximum fitted autofluorescence spectrum. The generated maximum fitted autofluorescence spectrum thus includes a maximum autofluorescence contribution at each channel (where the maximum autofluorescence contribution at each channel being derived from the fitted autofluorescence spectrum at that channel having a maximum value). For instance, if three spectra are fitted to a measured pixel spectrum, and the intensity values in channel 4 of the each fitted autofluorescence spectrum are about 0.25 (first fitted autofluorescence spectrum), about 0.15 (second fitted autofluorescence spectrum), and about 0.2 (third fitted autofluorescence spectrum), the intensity value of the first fitted spectrum would be utilized as the data point at channel 4 for generating the maximum fitted autofluorescence spectrum. This process is then repeated for each channel such that maximum intensity value data points are accumulated for each channel, and the accumulated data points can then be used to generate the maximum fitted autofluorescence spectrum. It is this generated maximum fitted autofluorescence spectrum that is then subtracted from the respective measured pixel spectrum. This process is repeated for each pixel of the multichannel image, i.e. the maximum fitted autofluorescence spectrum is generated for each pixel and then that specific generated maximum fitted autofluorescence spectrum subtracted from the respective measured pixel spectrum.

Figure 5A:
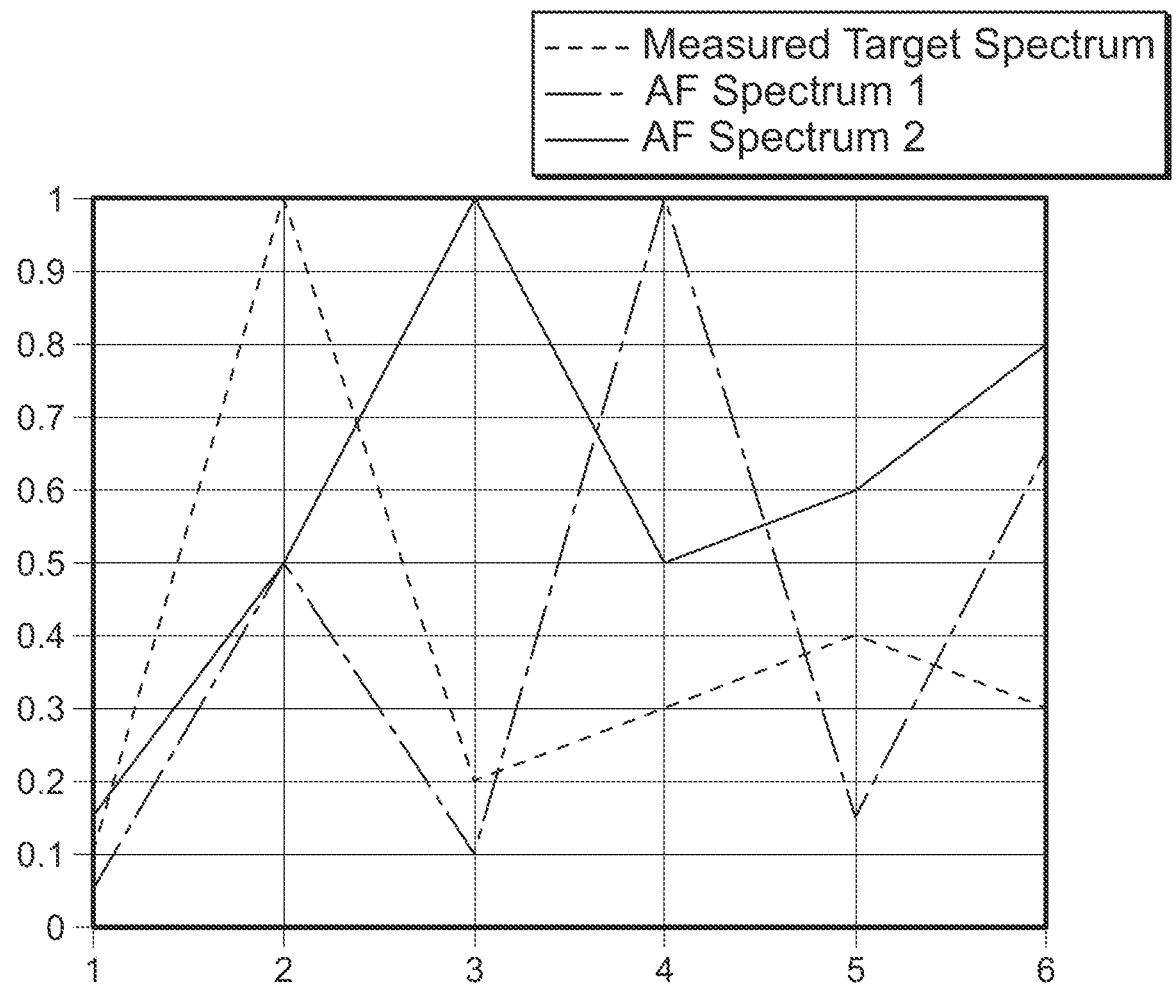
FIG. 5A illustrates a measured pixel spectrum and first and second retrieved autofluorescence spectra.
Figure 5B:
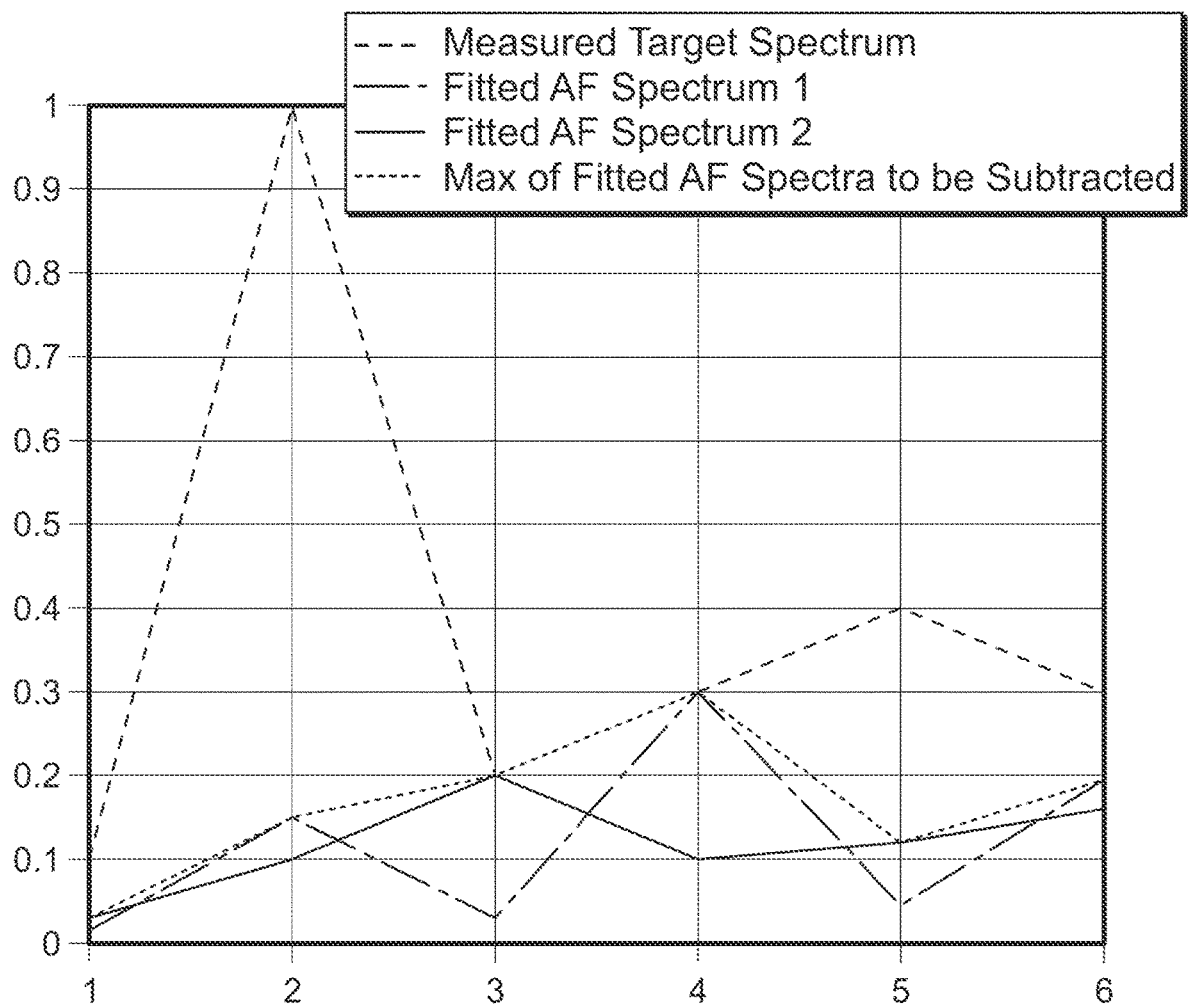
FIG. 5B illustrates a measured pixel spectrum, first and second fitted autofluorescence spectra, and a maximum fitted autofluorescence spectrum.

For example, and as illustrated in FIG. 5A, two reference autofluorescence spectra may be retrieved from a database within storage subsystem 104. Each of the retrieved first and second autofluorescence spectra may be fit to the measured pixel spectrum as shown in FIG. 5B, providing first and second fitted autofluorescence spectra. For each channel, a maximum intensity value of all fitted autofluorescence spectra is identified, and the accumulated identified maximum intensity values are used to generate the illustrated maximum fitted autofluorescence spectrum.

Figure 3A:
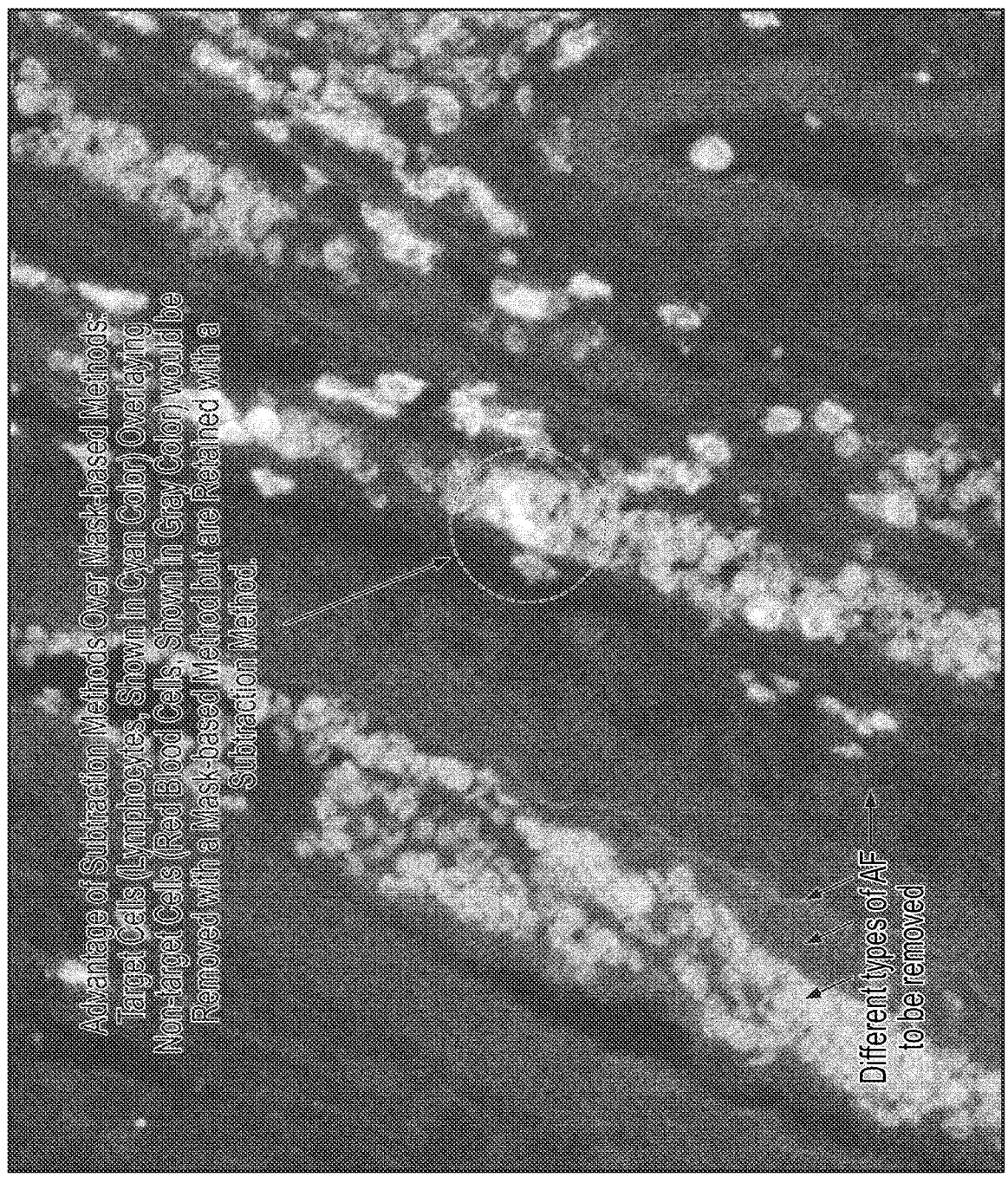
FIG. 3A illustrates regions within a multichannel image that correspond to autofluorescence.
Figure 3B:
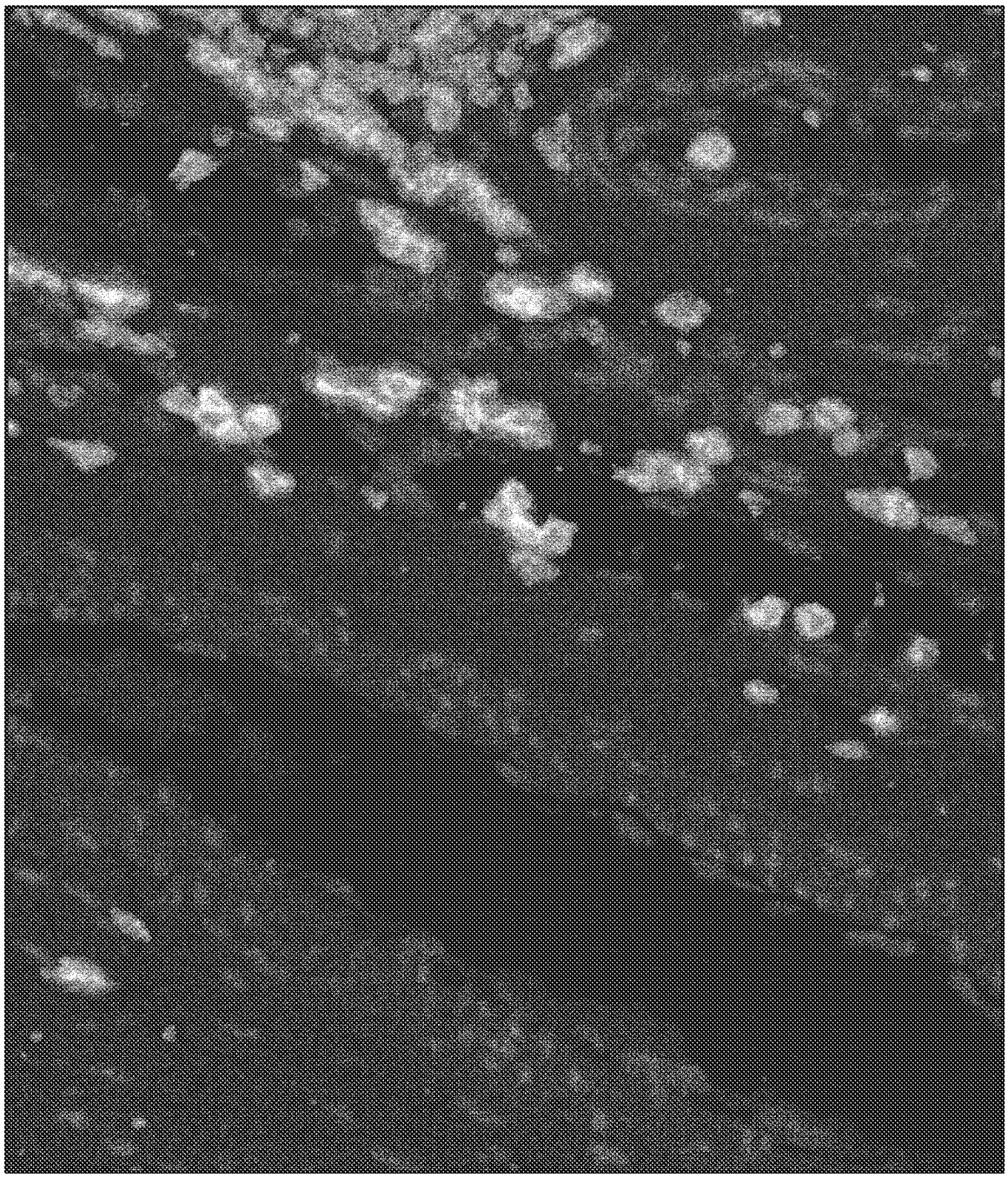
FIG. 3B illustrates an autofluorescence removed multichannel image where the identified unwanted autofluorescence from FIG. 3A has been removed.

FIGS. 3A and 3B show the result of the image subtraction process using two or more autofluorescence spectra (i.e. using the method 2). For example, the autofluorescence spectra of identified unwanted signals from FIG. 3A may each be fit to every measured pixel spectrum in the multichannel image such that the contributions of autofluorescence for each channel in each pixel of the multichannel image may be estimated. The estimated contributions of autofluorescence for each channel may then be subtracted from the from the measured spectra at each pixel, providing the autofluorescence removed multichannel image of FIG. 3B.

In some embodiments, the number of stored autofluorescence spectra that may be fit to a measured pixel spectrum may range from between 2 and about 1000 spectra. In other embodiments, the number of stored autofluorescence spectra that may be fit to a measured pixel spectrum may range from between 2 and about 500 spectra. In yet other embodiments, the number of stored autofluorescence spectra that may be fit to a measured pixel spectrum may range from between 2 and about 250 spectra. In further embodiments, the number of stored autofluorescence spectra that may be fit to a measured pixel spectrum may range from between 2 and about 125 spectra. In yet further embodiments, the number of stored autofluorescence spectra that may be fit to a measured pixel spectrum may range from between about 5 and about 75 spectra. In even further embodiments, the number of stored autofluorescence spectra that may be fit to a measured pixel spectrum may range from between about 5 and about 50 spectra.

Figure 2C:
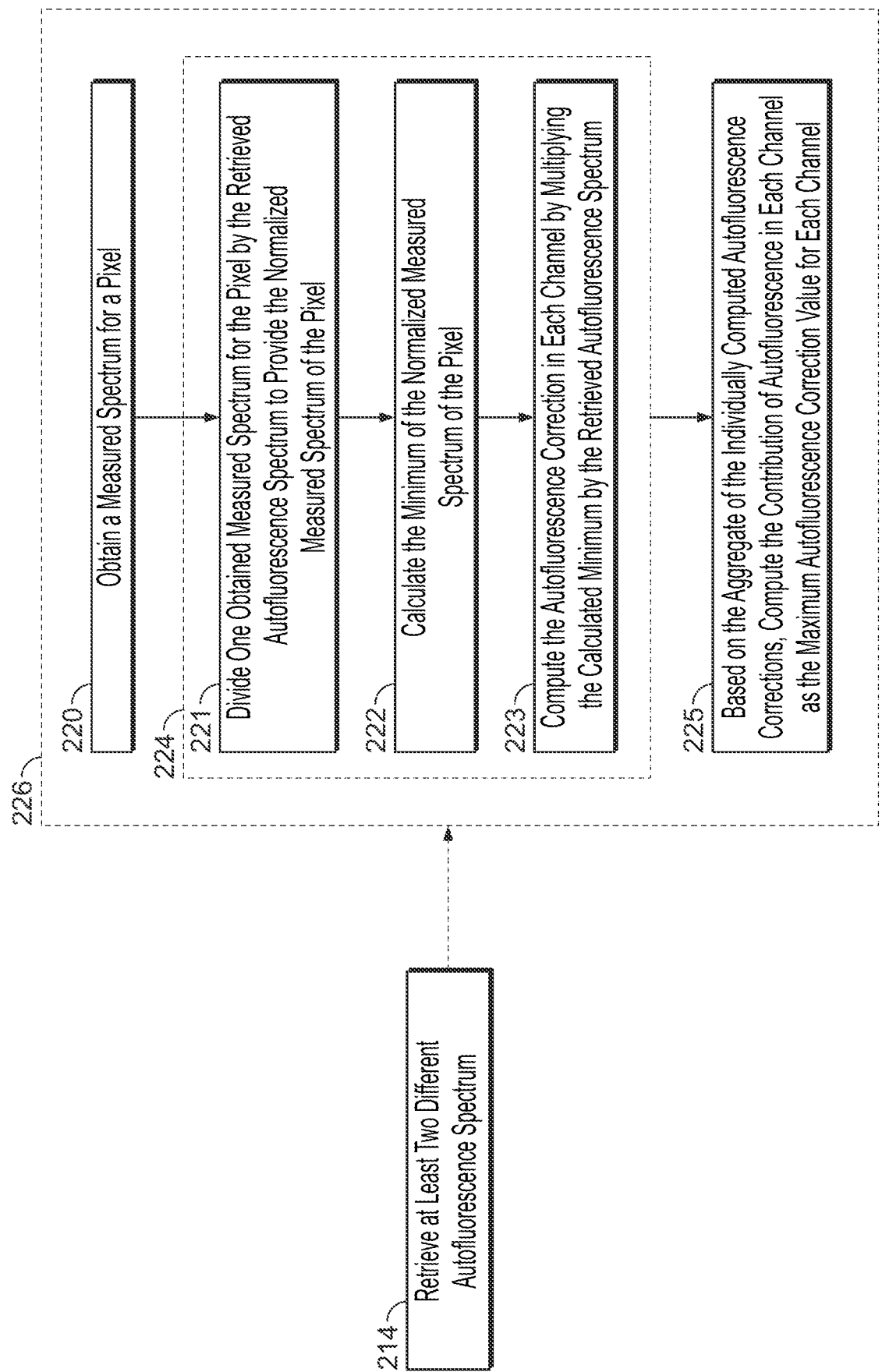
FIG. 2C sets forth a flowchart illustrating the various steps of computing the contributions of autofluorescence in each channel of a measured pixel spectrum using two or more different autofluorescence spectra, in accordance with some embodiments.
Figure 2D:
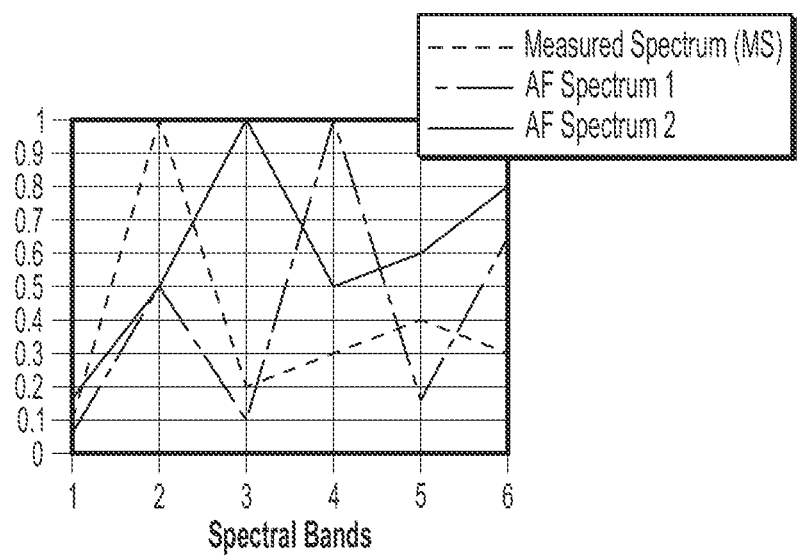
Figure 2D:
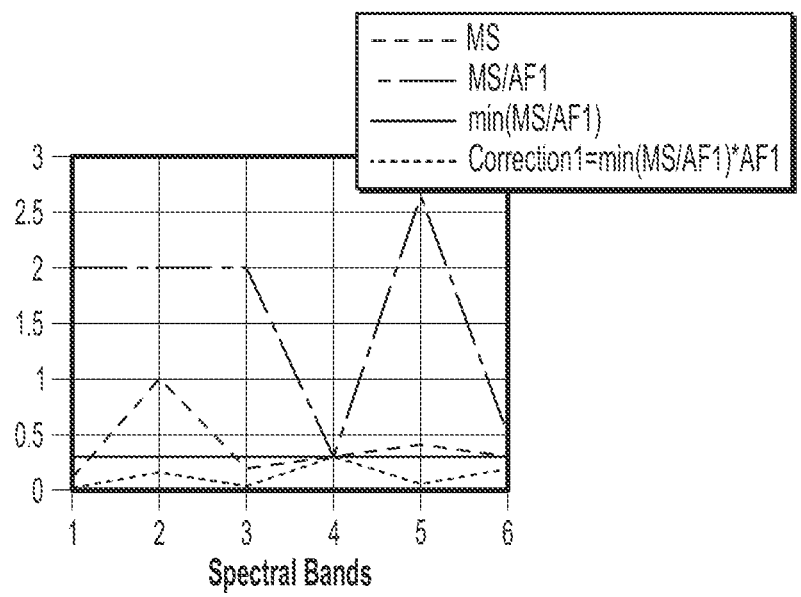
Figure 2D:
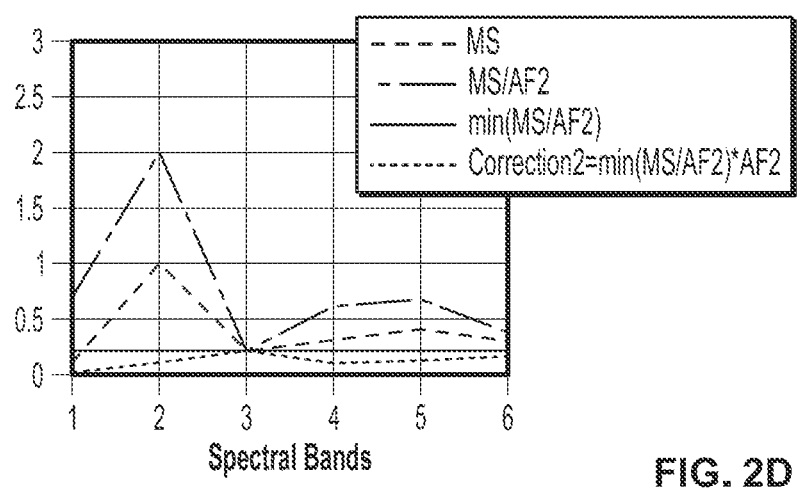

The process of fitting two or more different autofluorescence spectra within a measured pixel spectrum and generating a maximum fitted autofluorescence spectrum is illustrated in FIGS. 2C and 2D. In some embodiments, a measured pixel spectrum for a pixel of the input multichannel image is obtained (220). In some embodiments, and with reference to FIG. 2D (see graph 1), the measured spectrum (MS) and an autofluorescence spectra (AF) are measured offline. In the example in FIG. 2D, there are two such spectra, namely AF1 and AF2. The measured pixel spectrum is divided by a first retrieved autofluorescence spectrum (227) to provide a normalized measured spectrum for the particular pixel (221), e.g. an intensity value in each channel of the measured spectrum is divided by the intensity value in each respective channel of the autofluorescence spectrum. Next, the minimum of the normalized measured spectrum is calculated (222). From this calculated minimum value, the autofluorescence correction in each channel may be computed, such as by multiplying the calculated minimum value by the retrieved autofluorescence spectrum (step 223). With regard to FIG. 2D (see graph 2), the measured spectrum (MS) is divided by the autofluorescence spectrum AF1 and the minimum is then calculated. The Correction 1 is then computed by multiplying the calculated minimum by AF1.

As denoted by dashed box 224, the process of steps 221, 222, and 223 may be repeated for each retrieved autofluorescence spectrum (227). For example, and with reference to FIG. 2D (see graph 3), the measured spectrum (MS) may be divided by the autofluorescence spectra AF2 and then the minimum is calculated. The Correction 2 is then computed by multiplying the calculated minimum by AF1. As a result, an autofluorescence correction (a corrective spectrum) is individually computed for each retrieved autofluorescence spectrum. Based on the aggregate of the computed autofluorescence corrections, the contribution of autofluorescence in each channel is calculated as the maximum autofluorescence correction value for each channel (225).

In some embodiments, it is this computed contribution of autofluorescence in each channel, derived from the maximum autofluorescence correction in each channel, that may be subtracted from the respective channel in the input measured pixel spectrum. This process may be repeated (226) for each pixel of the input multichannel image. With reference to FIG. 2D (see graph 4), the final correction may be determined as the maximum of all corrections. With reference to graph 5 of FIG. 2D, the final correction may then be subtracted from the measured spectrum (MS) to provide the AF-removed spectrum In yet other embodiments, the contributions of autofluorescence within each channel are derived from one or more groupings of autofluorescence spectra. In some embodiments, autofluorescence spectra may be grouped by similarity. By way of a non-limiting example, autofluorescence spectra may be grouped according to their maximal wavelengths or spectral bands. For instance, a grouping of spectra may include those autofluorescence spectra whose maximal measured wavelength is about 610 to about 640 nm.

Figure 6A:
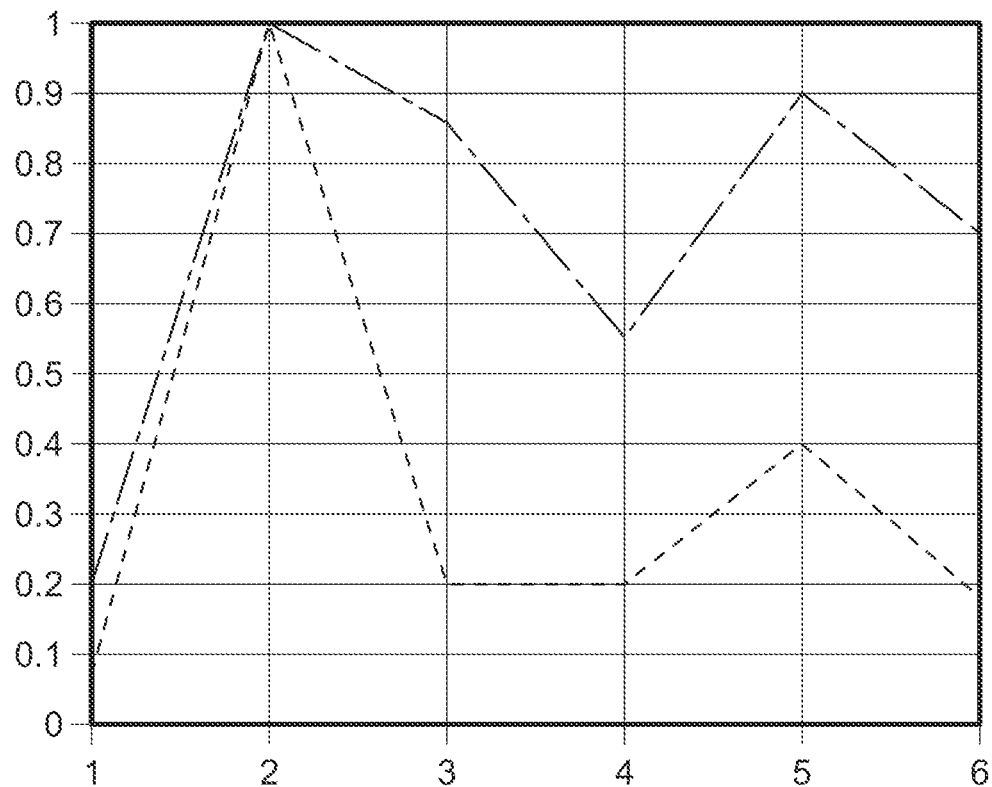
FIG. 6A illustrates a high and low spectral pair derived from a spectral grouping.
Figure 6B:
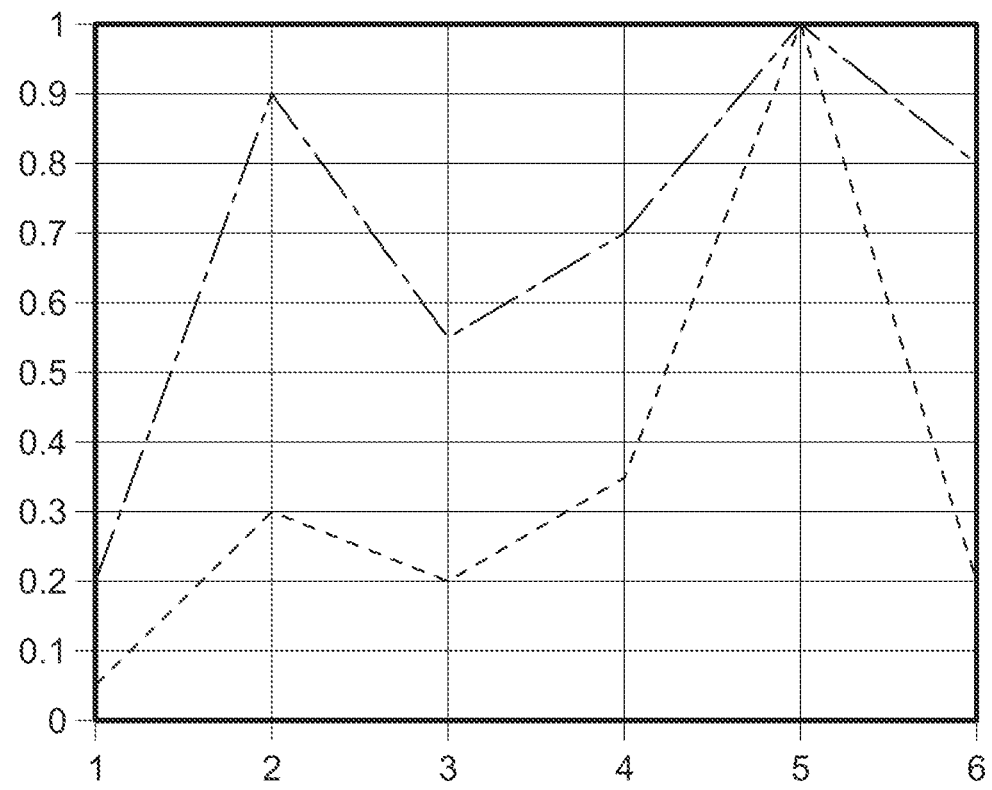
FIG. 6B illustrates another example of a high and low spectral pair derived from a spectral grouping.

Within each grouping of autofluorescence spectra, spectral pairs may be generated. In some embodiments, the generated spectral pairs comprise (i) a generated autofluorescence spectrum having highest intensity values for each channel; and (ii) a generated autofluorescence spectrum having lowest intensity values for each channel (referred to herein as "high and low spectral pairs"). For example, FIGS. 6A and 6B show generated high and low spectral pairs derived from two different groupings of autofluorescence spectra. Once the high and low spectral pairs are generated, all possible spectra between the high and low spectral pairs may be identified and removed, such as using the spectra fitting methods described herein.

Figure 6C:
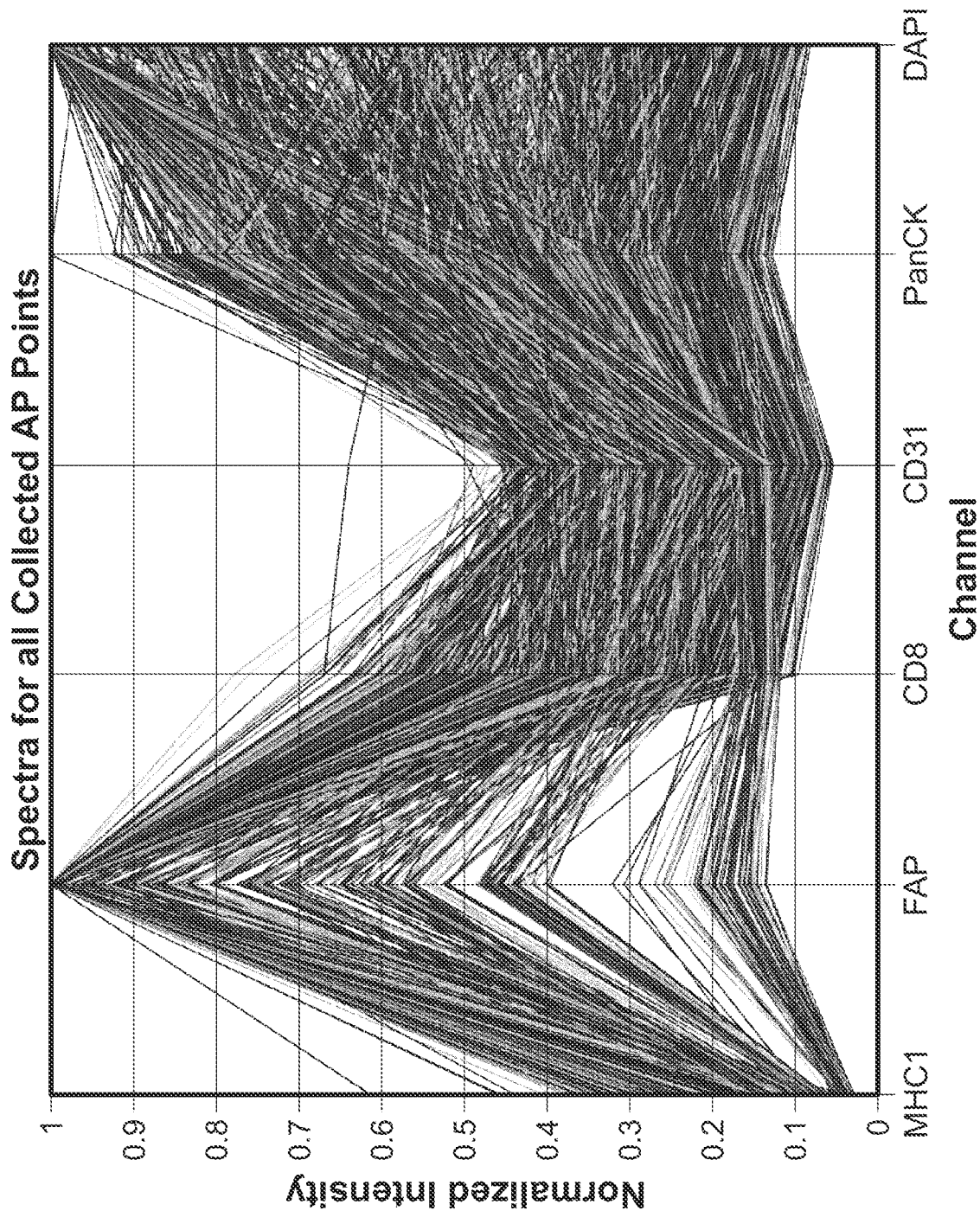
FIG. 6C illustrates a plurality of autofluorescence spectra obtained, such as from training images, and prior to grouping.

In some embodiments, the spectral groups comprise between 3 and about 200 collected autofluorescence spectra. In other embodiments, the spectral groups comprise between 3 and about 100 collected autofluorescence spectra. In yet other embodiments, the spectral groups comprise between 3 and about 50 collected autofluorescence spectra. For example, FIG. 6C illustrates collected spectra for six different image channels (each image channel having a different stain or label). The collected autofluorescence spectra in FIG. 6C are then grouped into different groups (or clusters). The grouping may be performed manually or may be performed automatically (e.g. using a k-means clustering method). FIG. 6D illustrates the different groups (or clusters) of autofluorescence spectra, each grouping including a plurality of individual autofluorescence spectra. In some embodiments, it is from these individual groupings (or clusters) that the high and low spectra pairs may be generated. In some embodiments, if the grouping is performed, then low-high pair is just a minimum and maximum of all spectra in the group in each channel. It is believed that the goal of grouping is to cover all collected spectra with the least possible removal, which is with the lowest possible combined area between low and high spectral curves.

Figure 6E:
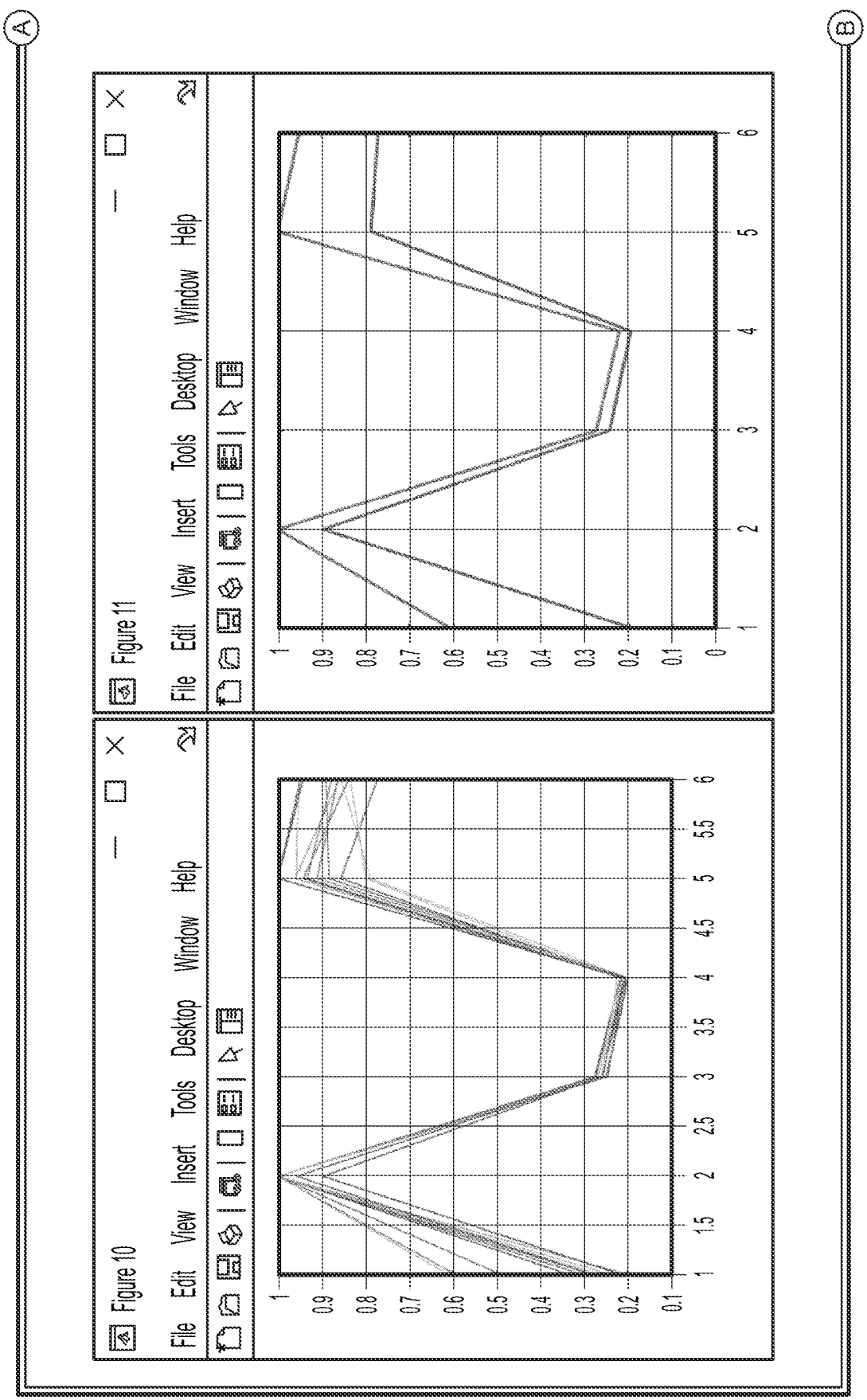
Figure 6F:
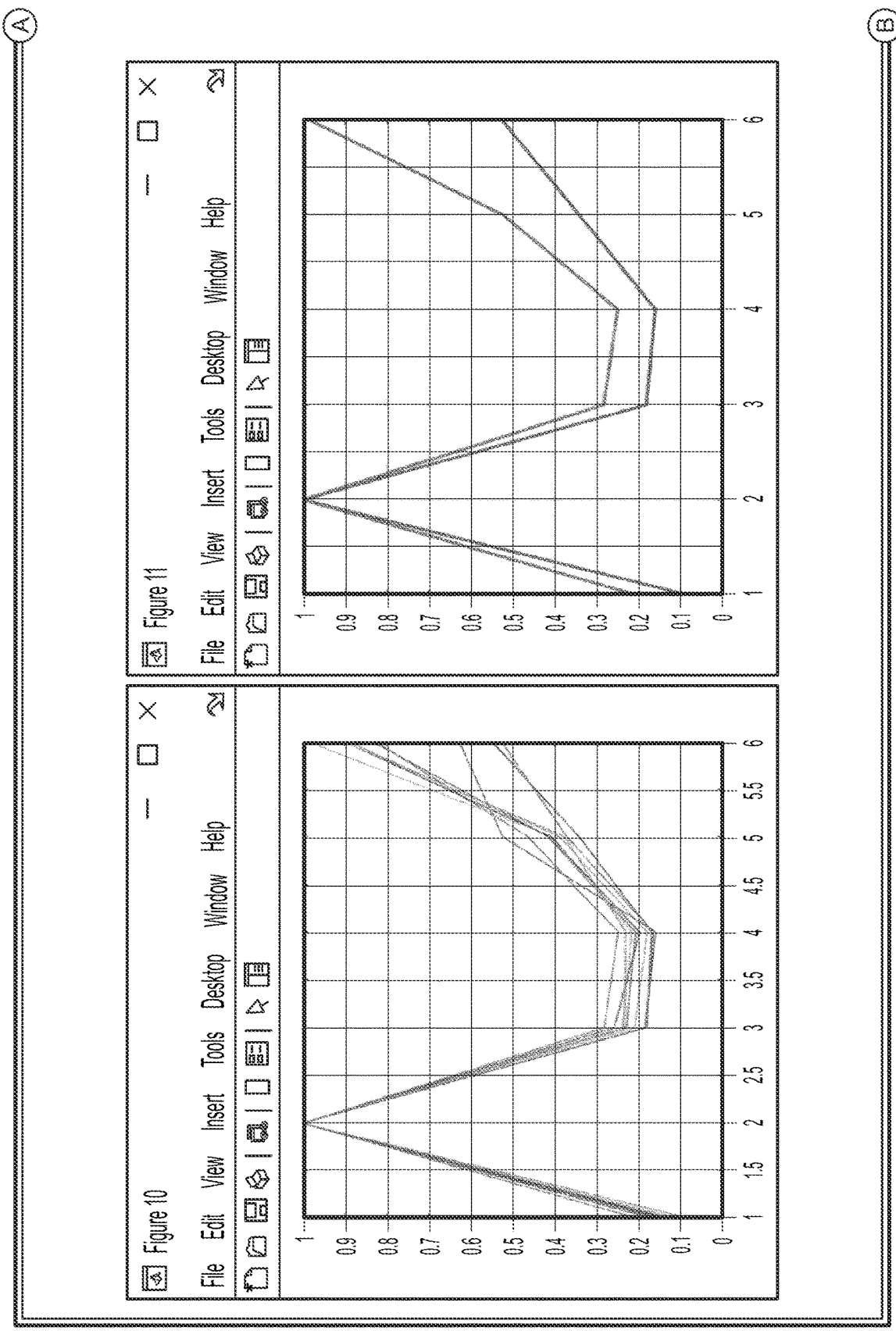
Figure 6G:
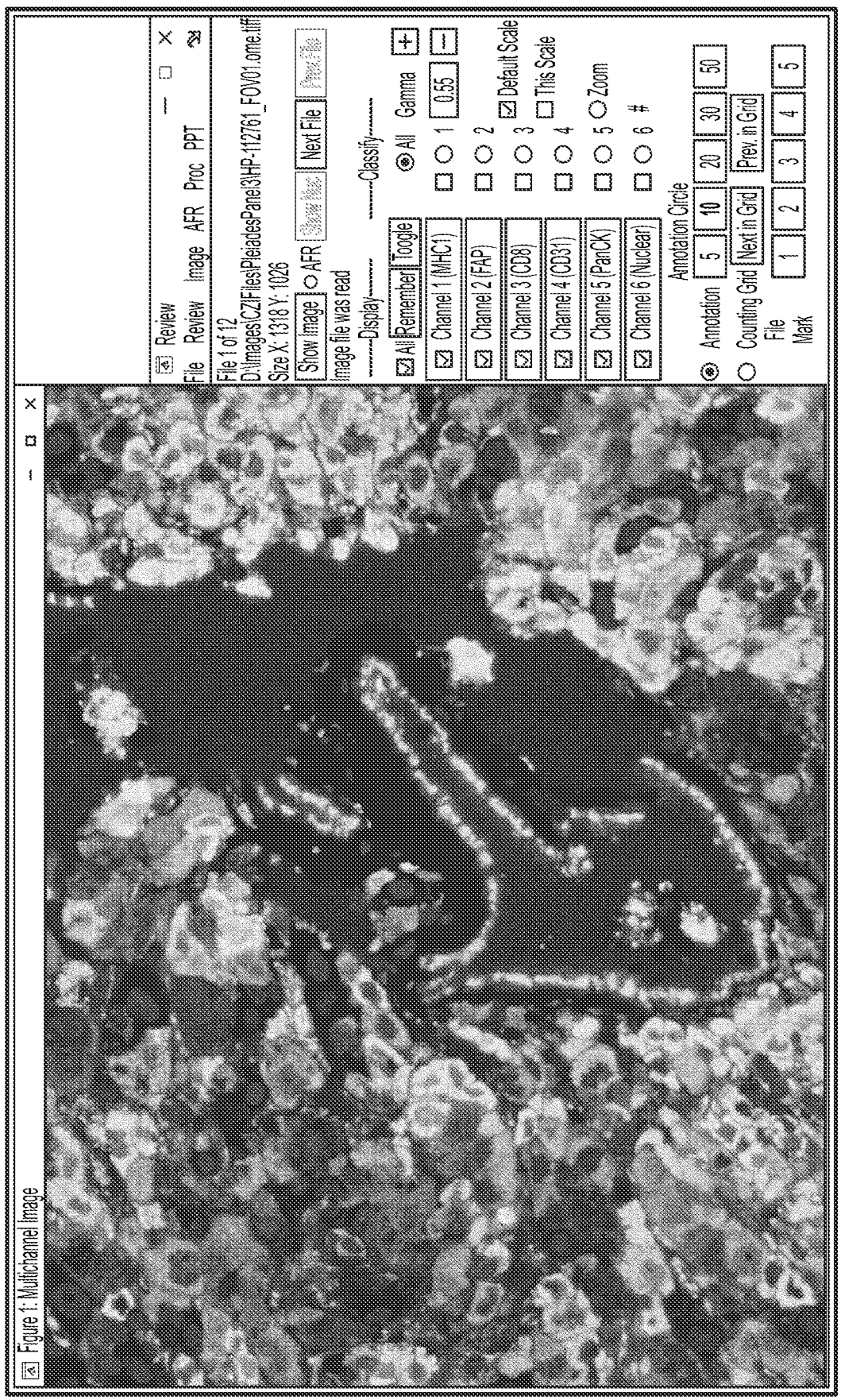
FIG. 6G provides an autofluorescence removed multichannel image, where computed contributions of autofluorescence (such as those contributions derived from the spectral pairs of FIGS. 6E and 6F) are removed.

The generation of spectral pairs from grouped autofluorescence spectra is yet further illustrated in FIG. 6E and FIG. 6F, where grouped autofluorescence spectra containing unwanted autofluorescence are collected from a multichannel image (see the upper left hand panel of each figure), and whereby the high and low spectra pairs are derived from the collected autofluorescence spectra (see lower left hand panel of each figure). The spectral pairs identified in both FIGS. 6E and 6F may then be utilized to determine the contributions of autofluorescence within each channel of the multichannel image, which may then be subtracted from the obtained multichannel image to provide the autofluorescence removed multichannel image of FIG. 6G. Additionally, FIGS. 6E and 6F show the collection of AF spectra, which are then stored in a database and from which they are subsequently retrieved.

Figure 2E:
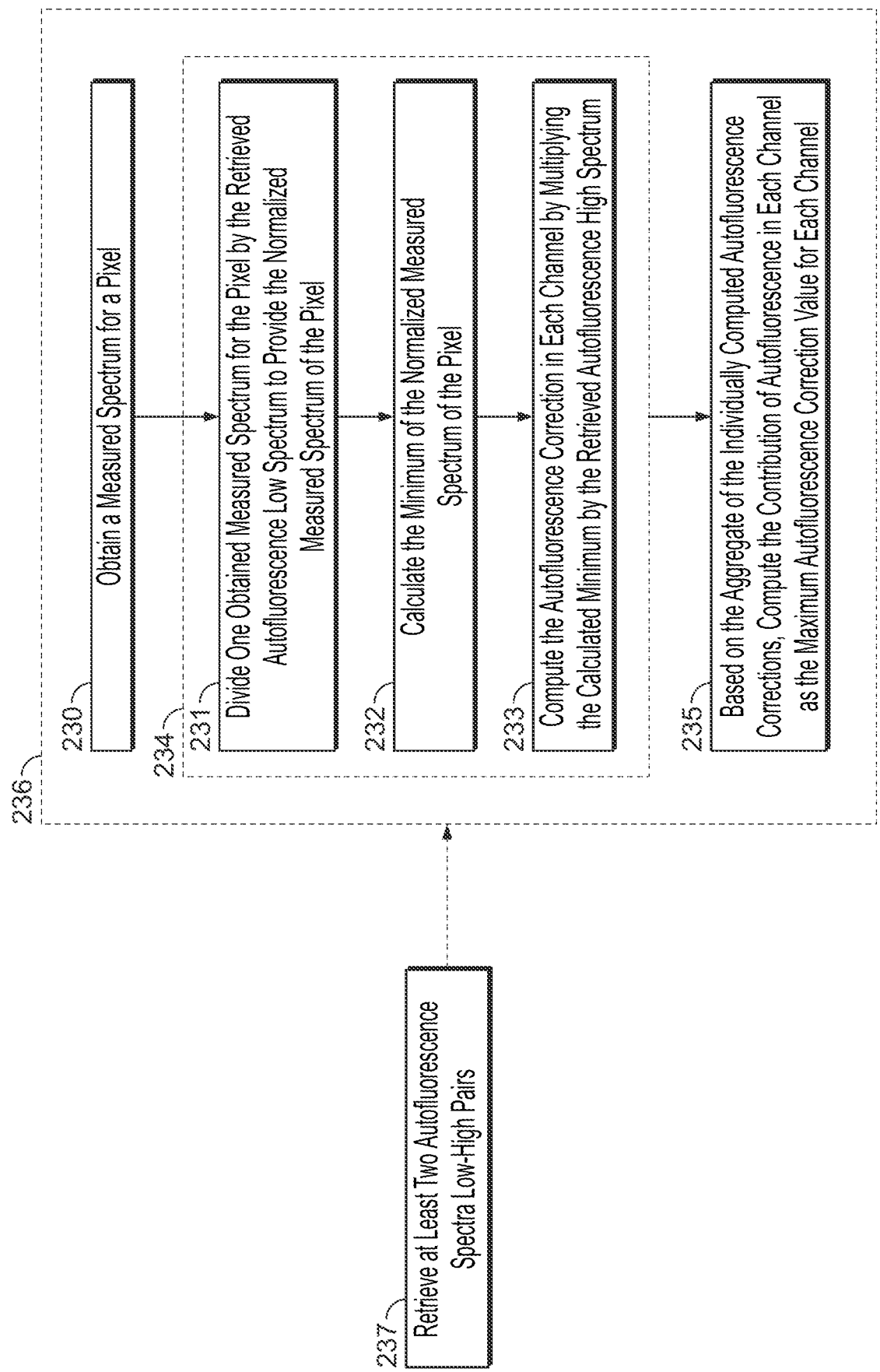
FIG. 2E sets forth a flowchart illustrating the various steps of computing the contributions of autofluorescence in each channel of a measured pixel spectrum using two or more autofluorescence spectral pairs, in accordance with some embodiments.
Figure 2F:
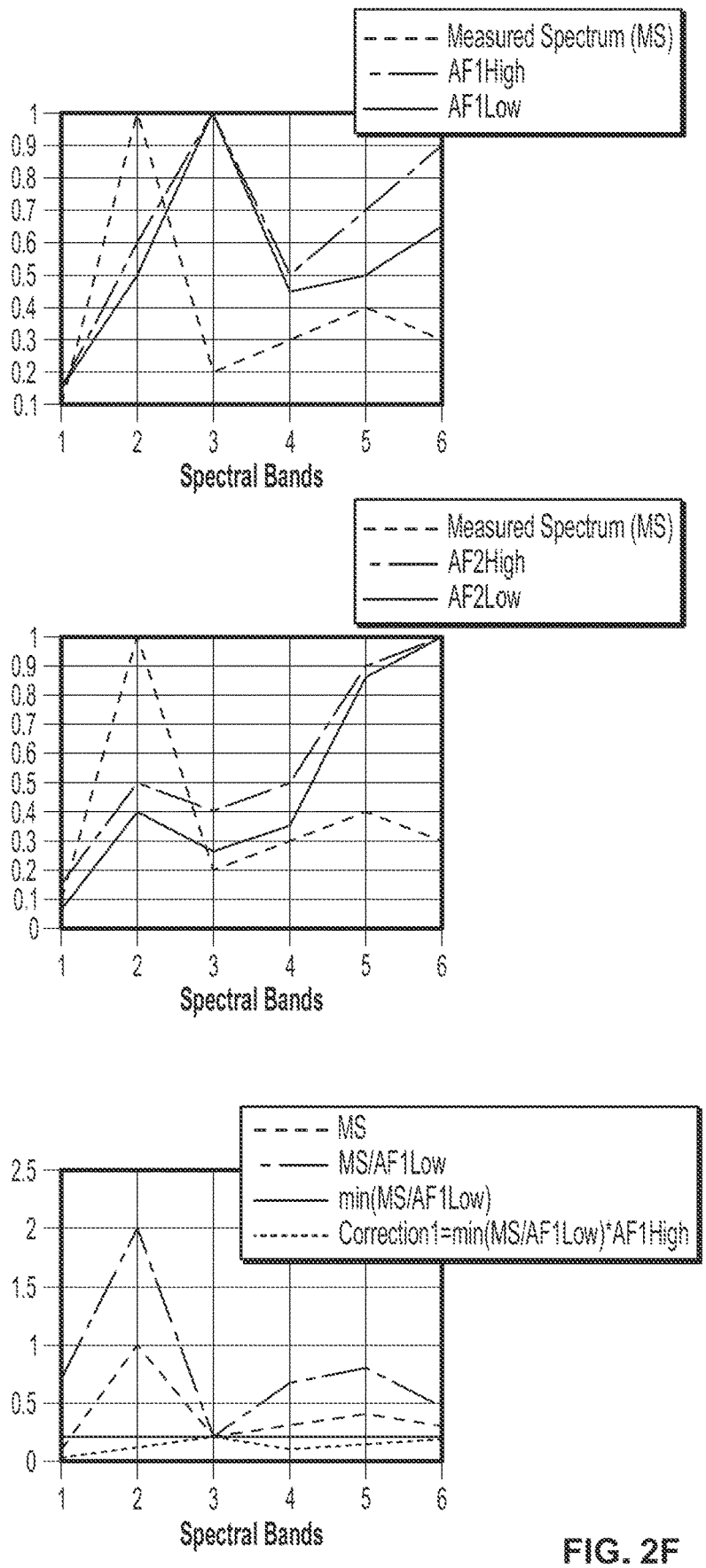

The process of fitting two or more different autofluorescence spectra within a measured pixel spectrum and generating a maximum fitted autofluorescence spectrum is illustrated in FIGS. 2E and 2F. In some embodiments, a measured pixel spectrum for a pixel of the input multichannel image is obtained (230). In some embodiments, and with reference to FIG. 2F (see graph 1), the measured spectrum (MS) and an autofluorescence spectra (AF) are measured offline. In the example in FIG. 2F, there are two such spectra, namely AF1 and AF2.

The measured pixel spectrum is divided by a first retrieved autofluorescence low spectrum (234) (e.g. from a single pair of high and low autofluorescence spectra) to provide a normalized measured spectrum for the particular pixel (231). Next, the minimum of the normalized measured spectrum is calculated (232). From this calculated minimum value, the autofluorescence correction in each channel may be computed, such as by multiplying the calculated minimum value by the retrieved autofluorescence high spectrum (step 233). With regard to FIG. 2F (see graph 2), the measured spectrum (MS) is divided by the autofluorescence spectrum AF1Low and the minimum is then calculated. The Correction 1 is then computed by multiplying the calculated minimum by AF1High.

As denoted by dashed box 234, the process of steps 231, 232, and 233 may be repeated for each retrieved autofluorescence spectral pair. For example, and with reference to FIG. 2F (see graphs 3 and 4), the measured spectrum (MS) may be divided by the autofluorescence spectra AF2Low and then the minimum is calculated. The Correction 2 is then computed by multiplying the calculated minimum by AF2High. As a result, an autofluorescence correction (a corrective spectrum) is individually computed for each retrieved autofluorescence spectral pair.

Based on the aggregate of the computed autofluorescence corrections, the contribution of autofluorescence in each channel is calculated as the maximum autofluorescence correction value for each channel (235). With reference to FIG. 2F (see graph 5), the final correction may be determined as the maximum of all corrections. With reference to graph 6 of FIG. 2F, the final correction may then be subtracted from the measured spectrum (MS) to provide the AF-removed spectrum It is this computed contribution of autofluorescence in each channel, derived from the maximum autofluorescence correction in each channel, that may be subtracted from the respective channel in the input measured pixel spectrum. This process may be repeated (236) for each pixel of the input multichannel image.

Figure 7A:
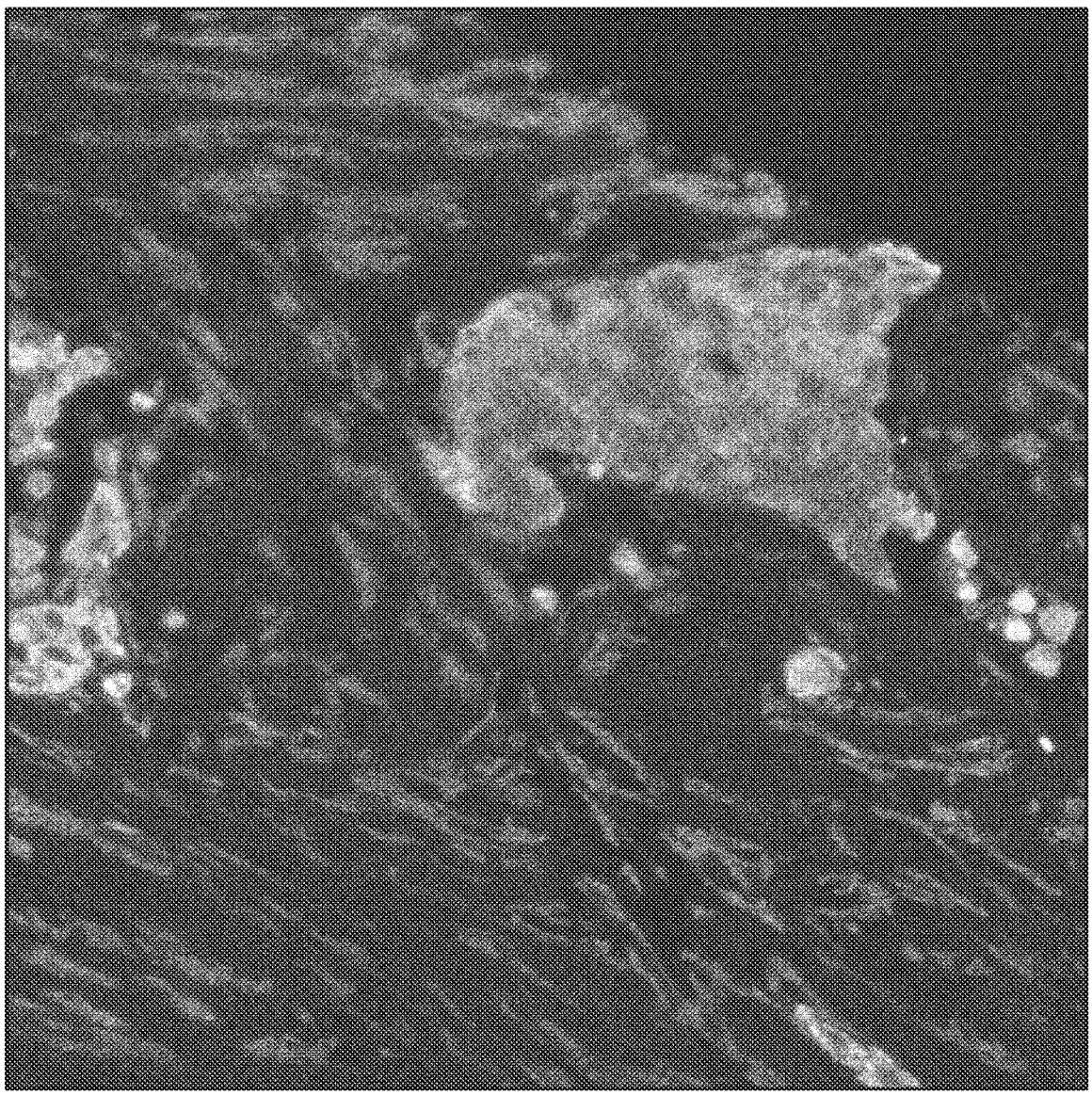
FIG. 7A illustrates a multichannel image prior stained with a plurality of fluorescent molecules.
Figure 7B:
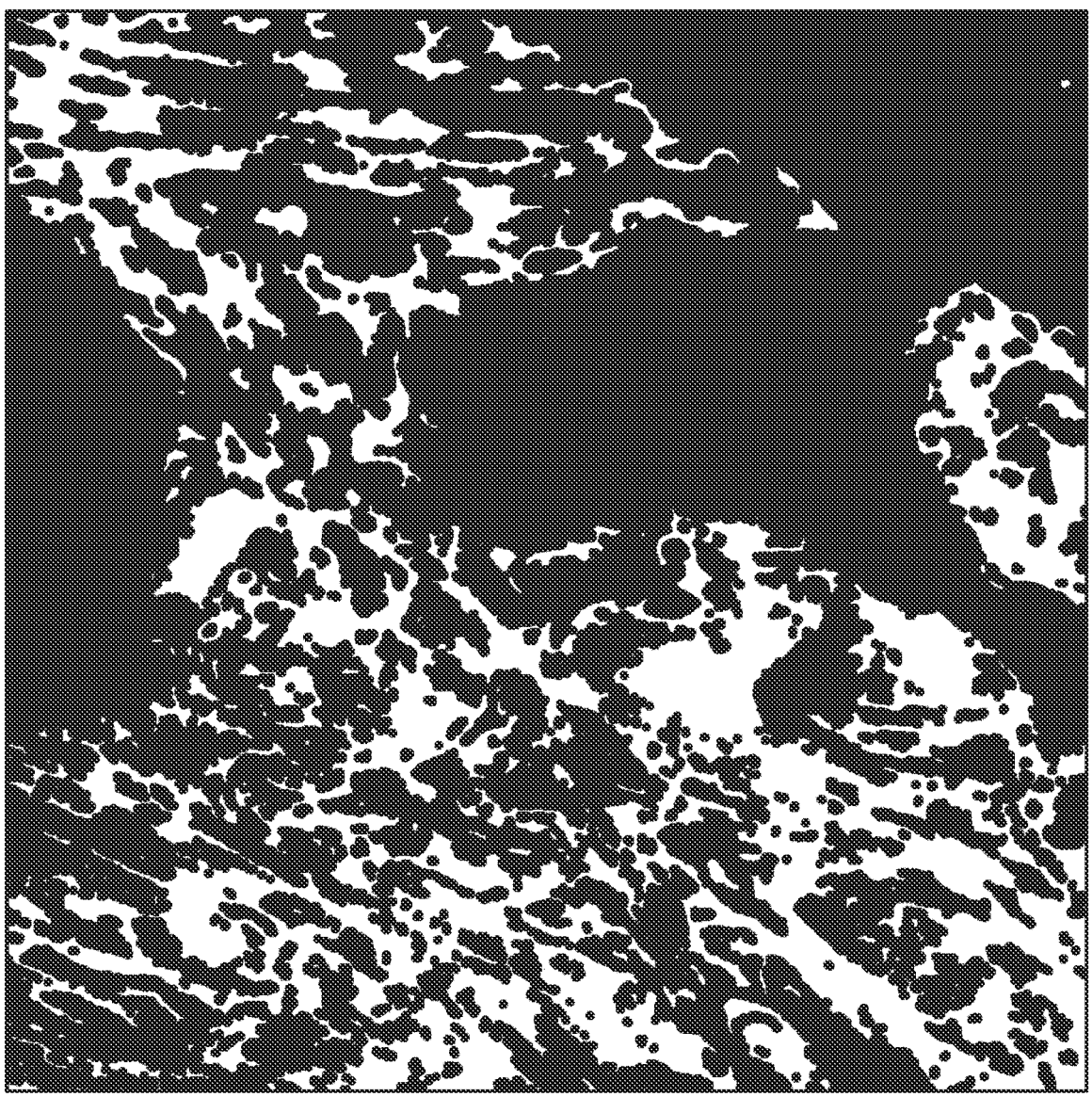
FIG. 7B illustrates an exclusion mask derived by spectral multi-thresholding a signal within FIG. 7A.

In some embodiments, one or more exclusion masks may be generated and the one or more exclusion masks may be applied to an input image to "mask out" certain components or structures within the input multichannel image. For example, given a specific spectrum, a pixel may be thresholded and if the spectrum of the pixel falls within a predetermined range, it may be added to an exclusion mask. Any thresholding technique may be applied, including global thresholding, Otsu's method, and local thresholding. Other examples of the thresholding techniques are described in US Patent Publications Nos. 2017/0294017, 2018/0012355, and 2017/0337695 or in PCT Publication No. WO/2018/115055 (the disclosures of which are hereby incorporated by reference herein in their entireties), any of which may be applied to generate an exclusion mask. An example of an exclusion mask derived from an input multichannel image (see FIG. 7A) is illustrated in FIG. 7B. In some embodiments, multiple exclusion masks may be generated and used to mask out portions of an input multichannel image so as to remove certain structures or components which contribute to autofluorescence.

Figure 7C:
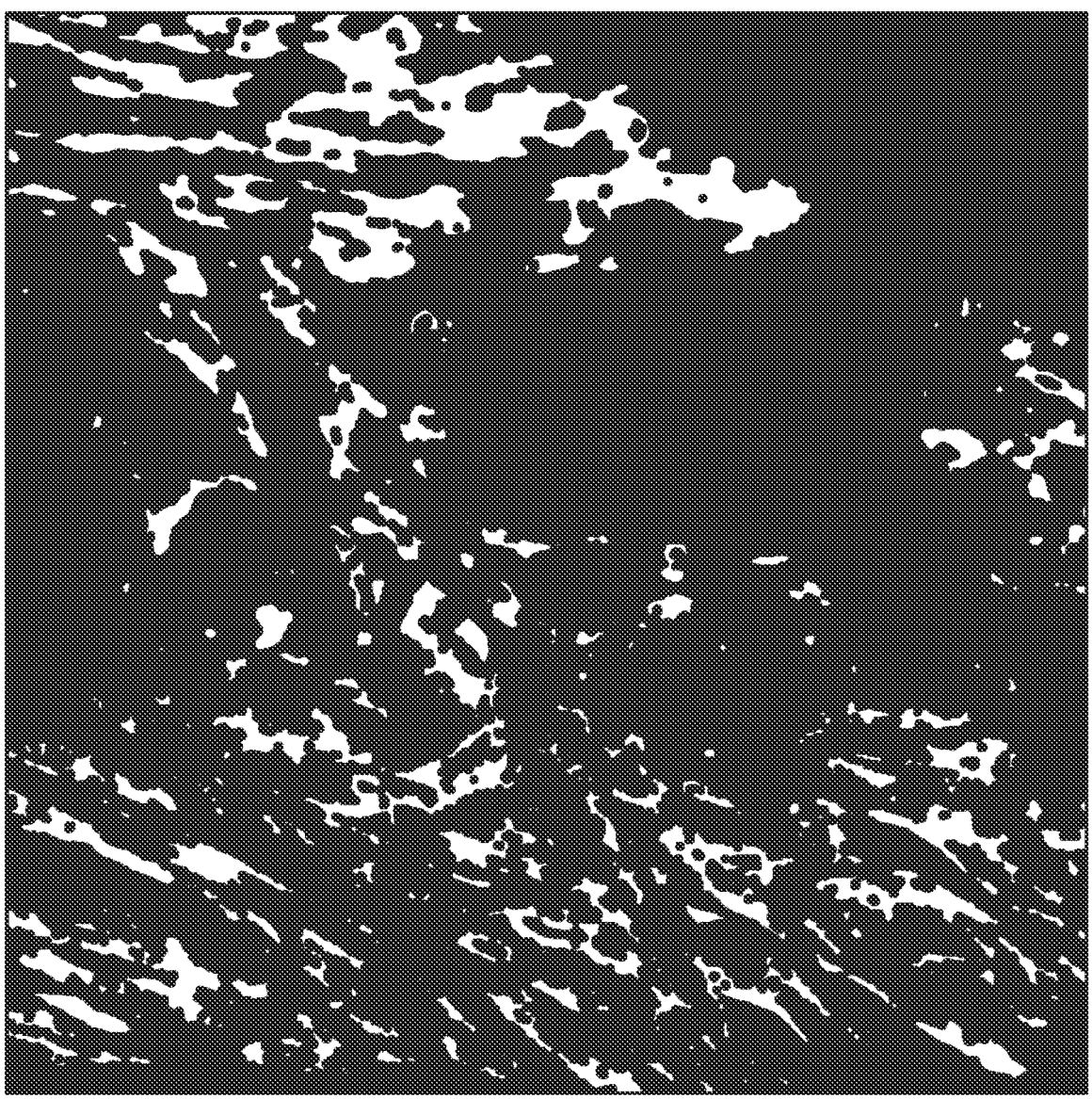
FIG. 7C illustrates an inclusion mask derived from FIG. 7A.
Figure 7D:
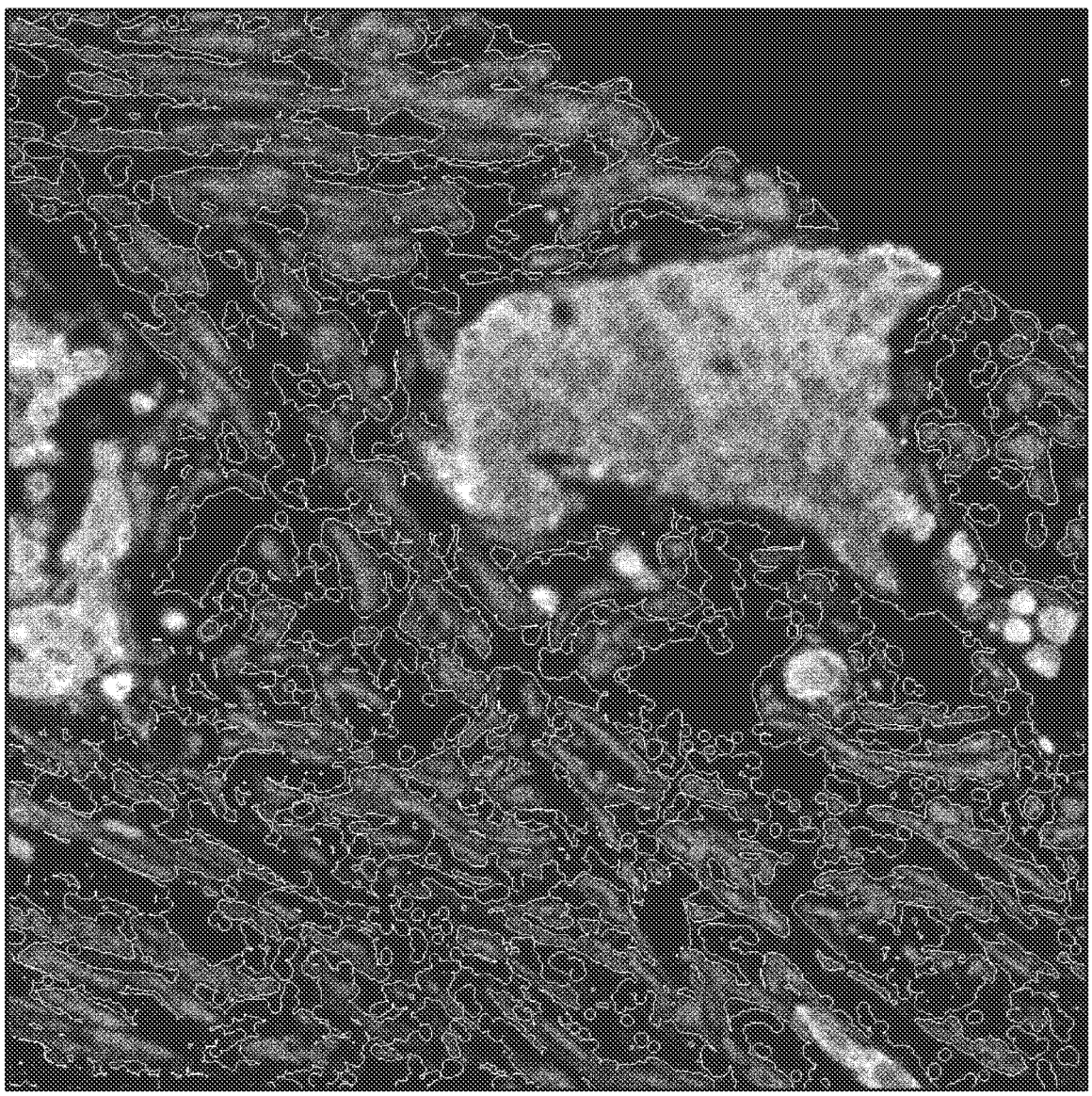
FIG. 7D illustrates an autofluorescence removed multichannel image after applying both the exclusion mask and the inclusion mask of FIGS. 7B and 7C, respectively.

In some embodiments, one or more inclusion masks may be generated. In some embodiments, the inclusion masks are generated based on desired fluorescence that should be retained within an input multichannel image. An example of an inclusion mask derived from an input multichannel image (see FIG. 7A) is illustrated in FIG. 7C. FIG. 7D demonstrates a generated autofluorescence removed multichannel image where both an exclusion mask and an inclusion mask were applied. The exclusion mask is overlaid in FIG. 7D for illustrative purposes, i.e. to show where autofluorescence has been removed.

ADDITIONAL EMBODIMENTS

Additional Embodiment 1. A method of removing contributions of autofluorescence in one or more channels of a multichannel image of a biological sample stained with one or more fluorescent labels, comprising independently calculating the contribution of autofluorescence in each channel of each pixel of the multichannel image based on one or more retrieved autofluorescence spectra, and subtracting from each measured pixel spectrum of the multichannel image the calculated contribution of autofluorescence in each channel for that respective pixel.

Additional Embodiment 2. The method of additional embodiment 1, wherein the contribution of autofluorescence in each channel of each pixel of the multichannel image is calculated from a single retrieved autofluorescence spectrum.

Additional Embodiment 3. The method of additional embodiment 2, wherein the single retrieved autofluorescence spectrum is derived from measured signals corresponding to unlabeled portions of a training multichannel image of a biological sample.

Additional Embodiment 4. The method of additional embodiment 3, wherein the training multichannel image of the biological sample comprises one or more fluorescent labels.

Additional Embodiment 5. The method of additional embodiment 2, wherein the contribution of autofluorescence in each channel of each pixel is calculated by independently fitting the single retrieved autofluorescence spectrum to each measured spectrum of a pixel of the multichannel image.

Additional Embodiment 6. The method of additional embodiment 5, wherein the fitting comprises (i) dividing the measured spectrum of the pixel of the multichannel image by the single retrieved autofluorescence spectrum to provide a normalized measured spectrum of the pixel; (ii) calculating the minimum of the normalized measured spectrum of the pixel; and (iii) scaling the calculated minimum by the single retrieved autofluorescence spectrum.

Additional Embodiment 7. The method of additional embodiment 1, wherein the contribution of autofluorescence in each channel of each pixel of the multichannel image is calculated from at least two retrieved autofluorescence spectra.

Additional Embodiment 8. The method of additional embodiment 7, wherein the at least two retrieved autofluorescence spectra are derived from measured signals corresponding to unlabeled portions of training multichannel images of a biological sample.

Additional Embodiment 9. The method of additional embodiment 8, wherein the training multichannel image of the biological sample comprises one or more fluorescent labels.

Additional Embodiment 10. The method of additional embodiment 8, wherein the calculated contribution of autofluorescence in each channel of each pixel of the multichannel image is a maximum autofluorescence correction value independently identified for each channel of each pixel of the multichannel image.

Additional Embodiment 11. The method of additional embodiment 10, wherein the maximum autofluorescence correction for each channel of each pixel of the multichannel image is identified by: (i) computing at least two estimated autofluorescence corrections for each channel by independently fitting each of the at least two retrieved autofluorescence spectra to a measured spectrum of a pixel; (ii) determining in each channel a maximum autofluorescence intensity value of the computed at least two estimated autofluorescence corrections.

Additional Embodiment 12. The method of additional embodiment 1, wherein the contribution of autofluorescence in each channel of each pixel of the multichannel image is calculated from at least two retrieved autofluorescence low-high spectral pairs.

Additional Embodiment 13. The method of additional embodiment 12, wherein the calculated contribution of autofluorescence in each channel of each pixel of the multichannel image is a maximum autofluorescence correction value independently identified for each channel of each pixel of the multichannel image.

Additional Embodiment 14. The method of additional embodiment 13, wherein the maximum autofluorescence correction for each channel of each pixel is calculated by: (i) computing at least two estimated autofluorescence corrections for each channel by independently fitting each of the retrieved at least two retrieved autofluorescence low-high spectral pairs to a measured spectrum of a pixel; and (ii) identifying in each channel a maximum autofluorescence intensity value of the computed at least two estimated autofluorescence corrections.

Additional Embodiment 15. The method of additional embodiment 14, wherein each independent fitting comprises (i) dividing the measured spectrum of the pixel of the multichannel image by a first autofluorescence low spectrum of one of the at least two autofluorescence low-high spectral pairs, (ii) calculating the minimum of the normalized measured spectrum of the pixel; and (iii) scaling the calculated minimum by a first autofluorescence high spectrum of the corresponding one of the at least two autofluorescence low-high spectral pairs.

Additional Embodiment 16. A system for removing contributions of autofluorescence in one or more channels of a multichannel image of a biological sample stained with one or more fluorescent labels, the system comprising: (i) one or more processors, and (ii) one or more memories coupled to the one or more processors, the one or more memories to store computer-executable instructions that, when executed by the one or more processors, cause the system to perform operations comprising: independently calculating the contribution of autofluorescence in each channel of each pixel of the multichannel image based on one or more retrieved autofluorescence spectra, and subtracting from each measured pixel spectrum of the multichannel image the calculated contribution of autofluorescence in each channel for that respective pixel.

Additional Embodiment 17. The method of additional embodiment 16, wherein the contribution of autofluorescence in each channel of each pixel of the multichannel image is calculated from a single retrieved autofluorescence spectrum.

Additional Embodiment 18. The method of additional embodiment 17 wherein the single retrieved autofluorescence spectrum is derived from measured signals corresponding to unlabeled portions of a training multichannel image of a biological sample.

Additional Embodiment 19. The method of additional embodiment 18, wherein the training multichannel image of the biological sample comprises one or more fluorescent labels.

Additional Embodiment 20. The method of additional embodiment 17, wherein the contribution of autofluorescence in each channel of each pixel is calculated by independently fitting the single retrieved autofluorescence spectrum to each measured spectrum of a pixel of the multichannel image.

Additional Embodiment 21. The method of additional embodiment 20, wherein the fitting comprises (i) dividing the measured spectrum of the pixel of the multichannel image by the single retrieved autofluorescence spectrum to provide a normalized measured spectrum of the pixel; (ii) calculating the minimum of the normalized measured spectrum of the pixel; and (iii) scaling the calculated minimum by the single retrieved autofluorescence spectrum.

Additional Embodiment 22. The method of additional embodiment 16, wherein the contribution of autofluorescence in each channel of each pixel of the multichannel image is calculated from at least two retrieved autofluorescence spectra.

Additional Embodiment 23. The method of additional embodiment 22, wherein the at least two retrieved autofluorescence spectra are derived from measured signals corresponding to unlabeled portions of training multichannel images of a biological sample.

Additional Embodiment 24. The method of additional embodiment 23, wherein the training multichannel image of the biological sample comprises one or more fluorescent labels.

Additional Embodiment 25. The method of additional embodiment 23, wherein the calculated contribution of autofluorescence in each channel of each pixel of the multichannel image is a maximum autofluorescence correction value independently identified for each channel of each pixel of the multichannel image.

Additional Embodiment 26. The method of additional embodiment 25, wherein the maximum autofluorescence correction for each channel of each pixel of the multichannel image is identified by: (i) computing at least two estimated autofluorescence corrections for each channel by independently fitting each of the at least two retrieved autofluorescence spectra to a measured spectrum of a pixel; (ii) determining in each channel a maximum autofluorescence intensity value of the computed at least two estimated autofluorescence corrections.

Additional Embodiment 27. The method of additional embodiment 16, wherein the contribution of autofluorescence in each channel of each pixel of the multichannel image is calculated from at least two retrieved autofluorescence low-high spectral pairs.

Additional Embodiment 28. The method of additional embodiment 27, wherein the calculated contribution of autofluorescence in each channel of each pixel of the multichannel image is a maximum autofluorescence correction value independently identified for each channel of each pixel of the multichannel image.

Additional Embodiment 29. The method of additional embodiment 28, wherein the maximum autofluorescence correction for each channel of each pixel is calculated by: (i) computing at least two estimated autofluorescence corrections for each channel by independently fitting each of the retrieved at least two retrieved autofluorescence low-high spectral pairs to a measured spectrum of a pixel; and (ii) identifying in each channel a maximum autofluorescence intensity value of the computed at least two estimated autofluorescence corrections.

Additional Embodiment 30. The method of additional embodiment 29, wherein each independent fitting comprises (i) dividing the measured spectrum of the pixel of the multichannel image by a first autofluorescence low spectrum of one of the at least two autofluorescence low-high spectral pairs, (ii) calculating the minimum of the normalized measured spectrum of the pixel; and (iii) scaling the calculated minimum by a first autofluorescence high spectrum of the corresponding one of the at least two autofluorescence low-high spectral pairs.

Additional Embodiment 31. A non-transitory computer-readable medium storing instructions for removing contributions of autofluorescence in one or more channels of a multichannel image of a biological sample stained with one or more fluorescent labels, comprising independently calculating the contribution of autofluorescence in each channel of each pixel of the multichannel image based on one or more retrieved autofluorescence spectra, and subtracting from each measured pixel spectrum of the multichannel image the calculated contribution of autofluorescence in each channel for that respective pixel.

Additional Embodiment 32. The method of additional embodiment 31, wherein the contribution of autofluorescence in each channel of each pixel of the multichannel image is calculated from a single retrieved autofluorescence spectrum.

Additional Embodiment 33. The method of additional embodiment 32 wherein the single retrieved autofluorescence spectrum is derived from measured signals corresponding to unlabeled portions of a training multichannel image of a biological sample.

Additional Embodiment 34. The method of additional embodiment 33, wherein the training multichannel image of the biological sample comprises one or more fluorescent labels.

Additional Embodiment 35. The method of additional embodiment 32, wherein the contribution of autofluorescence in each channel of each pixel is calculated by independently fitting the single retrieved autofluorescence spectrum to each measured spectrum of a pixel of the multichannel image.

Additional Embodiment 36. The method of additional embodiment 35, wherein the fitting comprises (i) dividing the measured spectrum of the pixel of the multichannel image by the single retrieved autofluorescence spectrum to provide a normalized measured spectrum of the pixel; (ii) calculating the minimum of the normalized measured spectrum of the pixel; and (iii) scaling the calculated minimum by the single retrieved autofluorescence spectrum.

Additional Embodiment 37. The method of additional embodiment 31, wherein the contribution of autofluorescence in each channel of each pixel of the multichannel image is calculated from at least two retrieved autofluorescence spectra.

Additional Embodiment 38. The method of additional embodiment 37, wherein the at least two retrieved autofluorescence spectra are derived from measured signals corresponding to unlabeled portions of training multichannel images of a biological sample.

Additional Embodiment 39. The method of additional embodiment 38, wherein the training multichannel image of the biological sample comprises one or more fluorescent labels.

Additional Embodiment 40. The method of additional embodiment 38, wherein the calculated contribution of autofluorescence in each channel of each pixel of the multichannel image is a maximum autofluorescence correction value independently identified for each channel of each pixel of the multichannel image.

Additional Embodiment 41. The method of additional embodiment 40, wherein the maximum autofluorescence correction for each channel of each pixel of the multichannel image is identified by: (i) computing at least two estimated autofluorescence corrections for each channel by independently fitting each of the at least two retrieved autofluorescence spectra to a measured spectrum of a pixel; (ii) determining in each channel a maximum autofluorescence intensity value of the computed at least two estimated autofluorescence corrections.

Additional Embodiment 42. The method of additional embodiment 31, wherein the contribution of autofluorescence in each channel of each pixel of the multichannel image is calculated from at least two retrieved autofluorescence low-high spectral pairs.

Additional Embodiment 43. The method of additional embodiment 42, wherein the calculated contribution of autofluorescence in each channel of each pixel of the multichannel image is a maximum autofluorescence correction value independently identified for each channel of each pixel of the multichannel image.

Additional Embodiment 44. The method of additional embodiment 43, wherein the maximum autofluorescence correction for each channel of each pixel is calculated by: (i) computing at least two estimated autofluorescence corrections for each channel by independently fitting each of the retrieved at least two retrieved autofluorescence low-high spectral pairs to a measured spectrum of a pixel; and (ii) identifying in each channel a maximum autofluorescence intensity value of the computed at least two estimated autofluorescence corrections.

Additional Embodiment 45. The method of additional embodiment 44, wherein each independent fitting comprises (i) dividing the measured spectrum of the pixel of the multichannel image by a first autofluorescence low spectrum of one of the at least two autofluorescence low-high spectral pairs, (ii) calculating the minimum of the normalized measured spectrum of the pixel; and (iii) scaling the calculated minimum by a first autofluorescence high spectrum of the corresponding one of the at least two autofluorescence low-high spectral pairs.

Additional Embodiment 46. A method of removing contributions of autofluorescence in one or more channels of a multichannel image of a biological sample stained with one or more fluorescent labels, comprising (a) independently calculating a maximum autofluorescence correction in each channel of each pixel of the multichannel image, wherein the calculated maximum autofluorescence correction in each channel of each pixel is derived from at least two different retrieved autofluorescence spectra; and (b) subtracting from each measured pixel spectrum of the multichannel image the calculated maximum autofluorescence correction in each channel for that pixel.

Additional Embodiment 47. A non-transitory computer-readable medium storing instructions for removing contributions of autofluorescence in one or more channels of a multichannel image of a biological sample stained with one or more fluorescent labels, comprising (a) independently calculating a maximum autofluorescence correction in each channel of each pixel of the multichannel image, wherein the calculated maximum autofluorescence correction in each channel of each pixel is derived from at least two different retrieved autofluorescence spectra; and (b) subtracting from each measured pixel spectrum of the multichannel image the calculated maximum autofluorescence correction in each channel for that pixel.

Additional Embodiment 48. A system for removing contributions of autofluorescence in one or more channels of a multichannel image of a biological sample stained with one or more fluorescent labels, the system comprising: (i) one or more processors, and (ii) one or more memories coupled to the one or more processors, the one or more memories to store computer-executable instructions that, when executed by the one or more processors, cause the system to perform operations comprising: (a) independently calculating a maximum autofluorescence correction in each channel of each pixel of the multichannel image, wherein the calculated maximum autofluorescence correction in each channel of each pixel is derived from at least two different retrieved autofluorescence spectra; and (b) subtracting from each measured pixel spectrum of the multichannel image the calculated maximum autofluorescence correction in each channel for that pixel.

Additional Embodiment 49. The system of additional embodiment 48, wherein the maximum autofluorescence correction for each channel of each pixel is calculated by: (i) computing at least two estimated autofluorescence corrections for each channel by independently fitting each of the retrieved at least two autofluorescence spectra to a measured spectrum of a pixel; (ii) identify in each channel a maximum autofluorescence intensity value of the computed at least two estimated autofluorescence corrections.

Additional Embodiment 50. The system of additional embodiment 49, wherein each independent fitting comprises (i) dividing the measured spectrum of the pixel of the multichannel image by one of the at least two retrieved autofluorescence spectra to provide a normalized measured spectrum of the pixel; (ii) calculating the minimum of the normalized measured spectrum of the pixel; and (iii) scaling the calculated minimum by the one of the at least two retrieved autofluorescence spectra.

Additional Embodiment 51. The system of additional embodiment 49, wherein the at least two retrieved autofluorescence spectra comprise at least two autofluorescence low-high spectral pairs.

Additional Embodiment 52. The system of additional embodiment 51, wherein each independent fitting comprises (i) dividing the measured spectrum of the pixel of the multichannel image by a first autofluorescence low spectrum of one of the at least two autofluorescence low-high spectral pairs, (ii) calculating the minimum of the normalized measured spectrum of the pixel; and (iii) scaling the calculated minimum by a first autofluorescence high spectrum of the corresponding one of the at least two autofluorescence low-high spectral pairs.

Additional Embodiment 53. A system for removing contributions of autofluorescence in one or more channels of a multichannel image of a biological sample stained with one or more fluorescent labels, the system comprising: (i) one or more processors, and (ii) one or more memories coupled to the one or more processors, the one or more memories to store computer-executable instructions that, when executed by the one or more processors, cause the system to perform operations comprising: independently calculating the contribution of autofluorescence in each channel of each pixel of the multichannel image based on at least two retrieved autofluorescence spectra, and subtracting from each measured pixel spectrum of the multichannel image the calculated contribution of autofluorescence in each channel for that respective pixel, wherein the two or more retrieved autofluorescence spectra are derived from measured signals corresponding to unlabeled portions of training multichannel images of a biological sample comprising one or more fluorescent labels.

Additional Embodiment 54. A non-transitory computer-readable medium storing instructions for removing contributions of autofluorescence in one or more channels of a multichannel image of a biological sample stained with one or more fluorescent labels, comprising independently calculating the contribution of autofluorescence in each channel of each pixel of the multichannel image based on at least two retrieved autofluorescence spectra, and subtracting from each measured pixel spectrum of the multichannel image the calculated contribution of autofluorescence in each channel for that respective pixel, wherein the two or more retrieved autofluorescence spectra are derived from measured signals corresponding to unlabeled portions of training multichannel images of a biological sample comprising one or more fluorescent labels.

Additional Embodiment 55. A method of removing contributions of autofluorescence in one or more channels of a multichannel image of a biological sample stained with one or more fluorescent labels, comprising independently calculating the contribution of autofluorescence in each channel of each pixel of the multichannel image based on at least two retrieved autofluorescence spectra, and subtracting from each measured pixel spectrum of the multichannel image the calculated contribution of autofluorescence in each channel for that respective pixel, wherein the two or more retrieved autofluorescence spectra are derived from measured signals corresponding to unlabeled portions of training multichannel images of a biological sample comprising one or more fluorescent labels.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method of removing contributions of autofluorescence in one or more channels of a multichannel image of a biological sample stained with one or more fluorescent labels, the method comprising:
   independently calculating a contribution of autofluorescence in each channel of each pixel of the multichannel image based: (i) on one or more retrieved autofluorescence spectra; and (ii) normalized measured spectra for pixels of the multichannel image, and
   subtracting from each measured pixel spectrum of the multichannel image the calculated contribution of autofluorescence in each channel for that respective pixel.

2. The method of claim 1, wherein the contribution of autofluorescence in each channel of each pixel of the multichannel image is calculated from a single retrieved autofluorescence spectrum.

3. The method of claim 2, wherein the single retrieved autofluorescence spectrum is derived from measured signals corresponding to unlabeled portions of a training multichannel image of a biological sample.

4. The method of claim 3, wherein the training multichannel image of the biological sample comprises one or more fluorescent labels.

5. The method of claim 2, wherein the contribution of autofluorescence in each channel of each pixel is calculated by independently fitting the single retrieved autofluorescence spectrum to each measured spectrum of a pixel of the multichannel image.

6. The method of claim 5, wherein the fitting comprises (i) dividing the measured spectrum of the pixel of the multichannel image by the single retrieved autofluorescence spectrum to provide a normalized measured spectrum of the pixel; (ii) calculating the minimum of the normalized measured spectrum of the pixel; and (iii) scaling the calculated minimum by the single retrieved autofluorescence spectrum.

7. The method of claim 1, wherein the contribution of autofluorescence in each channel of each pixel of the multichannel image is calculated from at least two retrieved autofluorescence spectra.

8. The method of claim 7, wherein the at least two retrieved autofluorescence spectra are derived from measured signals corresponding to unlabeled portions of training multichannel images of a biological sample.

9. The method of claim 8, wherein the training multichannel images of the biological sample comprises one or more fluorescent labels.

10. The method of claim 8, wherein the calculated contribution of autofluorescence in each channel of each pixel of the multichannel image is a maximum autofluorescence correction value independently identified for each channel of each pixel of the multichannel image.

11. The method of claim 10, wherein the maximum autofluorescence correction for each channel of each pixel of the multichannel image is identified by: (i) computing at least two estimated autofluorescence corrections for each channel by independently fitting each of the at least two retrieved autofluorescence spectra to a measured spectrum of a pixel; and (ii) determining in each channel a maximum autofluorescence intensity value of the computed at least two estimated autofluorescence corrections.

12. The method of claim 1, wherein the contribution of autofluorescence in each channel of each pixel of the multichannel image is calculated from at least two retrieved autofluorescence low-high spectral pairs.

13. The method of claim 12, wherein the calculated contribution of autofluorescence in each channel of each pixel of the multichannel image is a maximum autofluorescence correction value independently identified for each channel of each pixel of the multichannel image.

14. The method of claim 13, wherein the maximum autofluorescence correction for each channel of each pixel is calculated by: (i) computing at least two estimated autofluorescence corrections for each channel by independently fitting each of the at least two retrieved autofluorescence low-high spectral pairs to a measured spectrum of a pixel; and (ii) identifying in each channel a maximum autofluorescence intensity value of the computed at least two estimated autofluorescence corrections.

15. The method of claim 14, wherein each independent fitting comprises (i) dividing the measured spectrum of the pixel of the multichannel image by a first autofluorescence low spectrum of one of the at least two retrieved autofluorescence low-high spectral pairs, (ii) calculating the minimum of a normalized measured spectrum of the pixel; and (iii) scaling the calculated minimum by a first autofluorescence high spectrum of a corresponding one of the at least two retrieved autofluorescence low-high spectral pairs.

16. A system for removing contributions of autofluorescence in one or more channels of a multichannel image of a biological sample stained with one or more fluorescent labels, the system comprising:
one or more processors, and
one or more memories coupled to the one or more processors, the one or more memories to store computer-executable instructions that, when executed by the one or more processors, cause the system to perform operations comprising:
independently calculating a maximum autofluorescence correction in each channel of each pixel of the multichannel image, wherein the calculated maximum autofluorescence correction in each channel of each pixel is derived from: (i) at least two different retrieved autofluorescence spectral; and (ii) normalized measured spectra for pixels of the multichannel image; and
subtracting from each measured pixel spectrum of the multichannel image the calculated maximum autofluorescence correction in each channel for that pixel.

17. The system of claim 16, wherein the maximum autofluorescence correction for each channel of each pixel is calculated by: (i) computing at least two estimated autofluorescence corrections for each channel by independently fitting each of the at least two different retrieved autofluorescence spectra to a measured spectrum of a pixel; and (ii) identify in each channel a maximum autofluorescence intensity value of the computed at least two estimated autofluorescence corrections.

18. The system of claim 17, wherein each independent fitting comprises (i) dividing the measured spectrum of the pixel of the multichannel image by one of the at least two different retrieved autofluorescence spectra to provide a normalized measured spectrum of the pixel; (ii) calculating the minimum of the normalized measured spectrum of the pixel; and (iii) scaling the calculated minimum by the one of the at least two different retrieved autofluorescence spectra.

19. The system of claim 17, wherein the at least two different retrieved autofluorescence spectra comprise at least two autofluorescence low-high spectral pairs; and wherein each independent fitting comprises (i) dividing the measured spectrum of the pixel of the multichannel image by a first autofluorescence low spectrum of one of the at least two autofluorescence low-high spectral pairs, (ii) calculating the minimum of a normalized measured spectrum of the pixel; and (iii) scaling the calculated minimum by a first autofluorescence high spectrum of a corresponding one of the at least two autofluorescence low-high spectral pairs.

20. A non-transitory computer-readable medium storing instructions for removing contributions of autofluorescence in one or more channels of a multichannel image of a biological sample stained with one or more fluorescent labels, comprising:
independently calculating the contribution of autofluorescence in each channel of each pixel of the multichannel image based on: (i) at least two retrieved autofluorescence spectra; and (ii) normalized measured spectra for pixels of the multichannel image, and
subtracting from each measured pixel spectrum of the multichannel image the calculated contribution of autofluorescence in each channel for that respective pixel, wherein the at least two retrieved autofluorescence spectra are derived from measured signals corresponding to unlabeled portions of training multichannel images of a biological sample comprising one or more fluorescent labels.

* * * * *